(12) United States Patent
Nakamura et al.

(10) Patent No.: US 9,786,295 B2
(45) Date of Patent: Oct. 10, 2017

(54) VOICE PROCESSING APPARATUS AND VOICE PROCESSING METHOD

(71) Applicant: HONDA MOTOR CO., LTD., Tokyo (JP)

(72) Inventors: Keisuke Nakamura, Wako (JP); Kazuhiro Nakadai, Wako (KR)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/235,532

(22) Filed: Aug. 12, 2016

(65) Prior Publication Data

US 2017/0092284 A1 Mar. 30, 2017

(30) Foreign Application Priority Data

Sep. 29, 2015 (JP) ................. 2015-190593

(51) Int. Cl.

| | |
|---|---|
| *G10L 15/20* | (2006.01) |
| *G10L 21/003* | (2013.01) |
| *G10L 15/02* | (2006.01) |
| *G10L 15/08* | (2006.01) |
| *G10L 21/0216* | (2013.01) |
| *G10L 15/00* | (2013.01) |

(52) U.S. Cl.
CPC ............ *G10L 21/003* (2013.01); *G10L 15/02* (2013.01); *G10L 15/08* (2013.01); *G10L 15/20* (2013.01); *G10L 21/0216* (2013.01); *G10L 2021/02166* (2013.01)

(58) Field of Classification Search
CPC ..... G10L 21/003; G10L 15/20; G10L 21/0216; G10L 15/02; G10L 15/08; G10L 2021/02166
USPC .................................................. 704/226, 233
See application file for complete search history.

(56) References Cited

U.S. PATENT DOCUMENTS 7,440,891 B1 * 10/2008 Shozakai ................ G10L 15/20
704/226

FOREIGN PATENT DOCUMENTS

JP 2000-172291 6/2000

* cited by examiner

*Primary Examiner* — Thierry L Pham
(74) *Attorney, Agent, or Firm* — Rankin, Hill & Clark LLP

(57) ABSTRACT

A voice processing apparatus includes: a feature amount acquisition unit configured to acquire a spectrum of an audio signal for each frame; an utterance state determination unit configured to determine an utterance state for each frame on the basis of the audio signal; and a spectrum normalization unit configured to calculate a normalized spectrum in a current utterance by normalizing a spectrum for each frame in the current utterance using at least an average spectrum acquired until the present time.

9 Claims, 17 Drawing Sheets

FIG. 10

| | CORRECT WORD INTERPRETATION RATE | WORD RECOGNITION RATE | SUBSTITUTION ERROR RATE | DELETION ERROR RATE | INSERTION ERROR RATE |
|---|---|---|---|---|---|
| OFFLINE SMN | 80.24 | 85.99 | 10.04 | 3.97 | 5.75 |
| FIRST EMBODIMENT | 74.53 | 79.88 | 12.72 | 7.39 | 5.35 |
| SECOND EMBODIMENT | 65.31 | 70.14 | 16.86 | 12.99 | 4.84 |
| THIRD EMBODIMENT | 80.34 | 84.94 | 10.48 | 4.58 | 4.60 |

VOICE PROCESSING APPARATUS AND VOICE PROCESSING METHOD

CROSS-REFERENCE TO RELATED APPLICATION

Priority is claimed on Japanese Patent Application No. 2015-190593, filed Sep. 29, 2015, the content of which is incorporated herein by reference.

BACKGROUND OF THE INVENTION

Field of the Invention

The present invention relates to a voice processing apparatus and a voice processing method.

Description of Related Art

In general, a voice recognition process includes a process in which a predetermined utterance feature amount is acquired from an acoustic signal input from a microphone and utterance content is specified using the utterance feature amount and a predetermined statistical model.

For example, a Mel-frequency Cepstrum coefficient (MFCC), a Mel-frequency Log Spectrum (MFLS), etc. are used as the utterance feature amount in some cases. A sound received through a microphone includes a sound in which a variety of noises such as reverberation, background noise, etc. are superimposed on a voice (a clean voice) uttered by a speaker in some cases. A voice recognition rate is reduced if an utterance feature amount acquired on the basis of an acoustic signal on which the noises are superimposed is used.

Thus, performance of a voice recognition process using an average spectrum obtained by averaging spectra for each frame before the utterance feature amount is calculated is suggested to reduce an influence of noise. For example, the voice recognition apparatus disclosed in Japanese Unexamined Patent Application, First Publication No. 2000-172291 (hereinafter referred to as Patent Literature 1), includes calculating a power spectrum of audio data, determining an acoustic model by calculating an average spectrum at the time of non-recognition of a voice, and recognizing each word of the voice according to the determined acoustic model of the power spectrum at the time of recognition of the voice.

SUMMARY OF THE INVENTION

However, the voice recognition apparatus disclosed in Patent Literature 1 calculates an average spectrum after waiting for an end of an utterance interval. For this reason, a time from a start of an utterance to an end of voice recognition tends to be longer.

Aspects related to the present invention were made in view of the above-described circumstances, and an object of the present invention is to provide a voice processing apparatus and a voice processing method which can shorten a time from a start of an utterance to an end of voice recognition without impairing voice recognition accuracy.

In order to accomplish the object, the present invention adopts the following aspects.

(1) A voice processing apparatus related to an aspect of the present invention includes: a feature amount acquisition unit configured to acquire a spectrum of an audio signal for each frame; an utterance state determination unit configured to determine an utterance state for each frame on the basis of the audio signal; and a spectrum normalization unit configured to calculate a normalized spectrum in a current utterance by normalizing a spectrum for each frame in the current utterance using at least an average spectrum acquired until the present time.

(2) In the aspect of (1), the spectrum normalization unit may use an average spectrum in a previous utterance as the average spectrum.

(3) In the aspect of (1), the spectrum normalization unit may use an average spectrum from a start of the current utterance to the present time as the average spectrum.

(4) In the aspect of (3), the voice processing apparatus may further include an event detection unit configured to detect an event which changes an acoustic environment, wherein the spectrum normalization unit may use an average spectrum after the event is detected as the average spectrum acquired until the present time.

(5) In the aspect of (4), the event detection unit may detect a sound related to the event, and the spectrum normalization unit may use an average spectrum of a sound detected by the event detection unit as the average spectrum from the start of the current utterance to the present time.

(6) In the aspect of any one of (3) to (5), the spectrum normalization unit may use an average spectrum in a previous utterance between the start of the current utterance and a predetermined time rather than the average spectrum from the start of the current utterance to the present time.

(7) In the aspect of (2) or (6), the previous utterance may be an utterance immediately before the current utterance.

(8) In the aspect of (2) or (6), the previous utterance may be a plurality of utterances which is stored in a storage unit in advance.

(9) In the aspect of any one of (1) to (8), the voice processing apparatus may further include: a sound source localization unit configured to determine a sound source direction on the basis of a multi-channel sound audio signal; and a sound source separation unit configured to separate the multi-channel audio signal into audio signals for every sound source on the basis of a transfer function from the sound source direction and output the sound-source-specific audio signals to the feature amount acquisition unit.

(10) A voice processing method related to an aspect of the present invention includes: a feature amount acquisition step of acquiring a spectrum of an audio signal for each frame; an utterance state determination step of determining an utterance state for each frame on the basis of the audio signal; and a spectrum normalization step of calculating a normalized spectrum in a current utterance by normalizing a spectrum for each frame in the current utterance using at least an average spectrum acquired until the present time.

According to the aspect of (1) or (10), spectra of components other than a voice, for example, stationary background noise, are removed from the acquired spectrum of the audio signal, and temporal variation of spectra according to an utterance is acquired. The voice recognition process is performed on the acquired component so that a time from an utterance start to a voice recognition end can be shortened without impairing voice recognition accuracy.

In the aspect of (2), since an average spectrum in an utterance which has already ended is used for normalizing a spectrum at that point in time without waiting for an end of a current utterance, a time taken until voice recognition of the current utterance ends can be shortened.

In the aspect of (3), an average spectrum in an already acquired interval of a current utterance can be acquired as an average spectrum used for normalizing a spectrum at that point in time. For this reason, a time taken until voice recognition of the current utterance ends can be shortened. Also, since an average spectrum of components other than a voice in an utterance until that point in time is used for normalizing the spectrum at that point in time, an error due to variation of an average spectrum over time is further reduced. For this reason, deterioration of voice recognition accuracy is further suppressed.

In the aspect of (4), the average spectrum used for normalizing the spectrum at that point in time is reset with the detection of the event. For this reason, a reduction of voice recognition accuracy due to a change of an acoustic environment caused by the event can be avoided.

In the aspect of (5), since a component of a sound generated due to the event is removed through normalization, a reduction of voice recognition accuracy due to the generated sound can be prevented.

In the aspect of (6), since variation of the average spectrum over time immediately after an utterance start does not occur, a reduction of voice recognition accuracy due to such variation can be avoided.

In the aspect of (7), since an average spectrum of components other than the voice in a previous utterance closest to a current utterance are used for normalizing the spectrum at that point in time, an error due to variation of the average spectrum over time is reduced. For this reason, deterioration of voice recognition accuracy is suppressed.

In the aspect of (8), since an average spectrum obtained by averaging various acoustic features is used for normalization, deterioration of voice recognition accuracy is suppressed as a whole even if variation in an acoustic feature occurs due to a speaker or the passage of time.

In the aspect of (9), components from other directions are removed from a spectrum of a sound-source-specific audio signal from a sound source located in a specific direction. A voice recognition process is performed on a component of temporal variation of a spectrum according to an utterance from the specific direction so that voice recognition accuracy can be further improved.

BRIEF DESCRIPTION OF THE DRAWINGS

FIG. 10 is a table illustrating an example of word interpretation accuracy acquired through an experiment.

DETAILED DESCRIPTION OF THE INVENTION (First Embodiment)

Hereinafter, a first embodiment of the present invention will be described with reference to the drawings.

Figure 1:
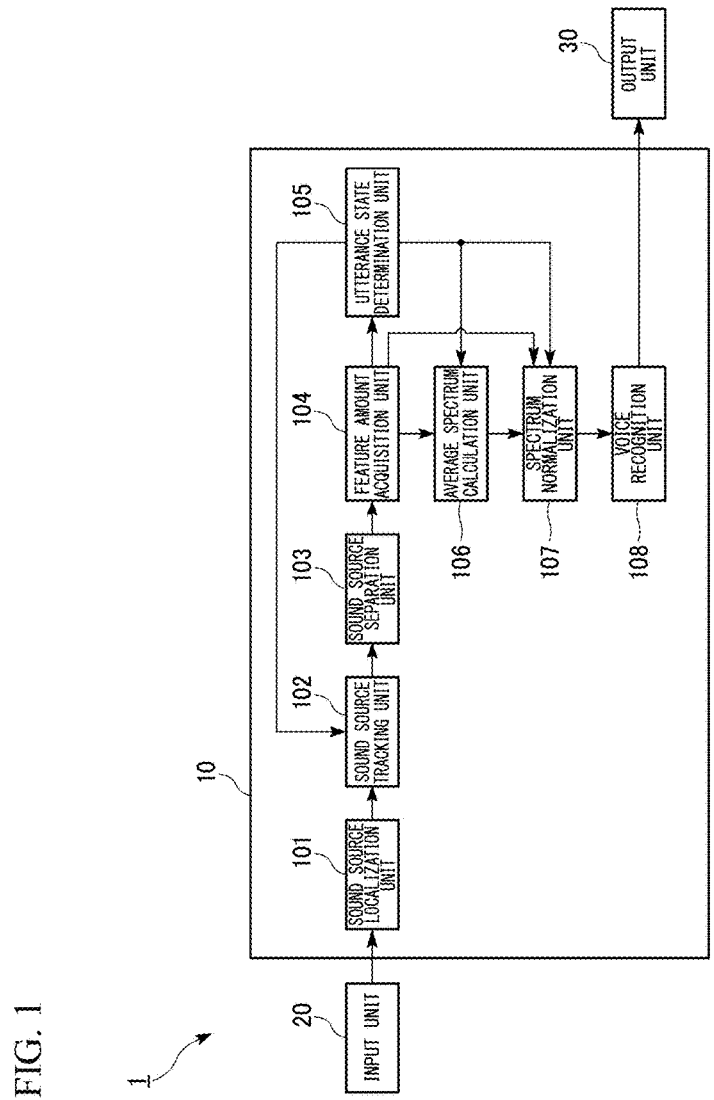
FIG. 1 is a block diagram showing a constitution of a voice processing system related to a first embodiment.

FIG. 1 is a block diagram showing a constitution of a voice processing system 1 related to the first embodiment.

The voice processing system 1 is configured to include a voice processing apparatus 10, an input unit 20, and an output unit 30.

The voice processing apparatus 10 acquires a spectrum of an audio signal input from the input unit 20 with respect to the audio signal for each frame with a predetermined length (for example, 20 ms). The voice processing apparatus 10 determines an utterance state of a voice for each frame on the basis of the input audio signal. The voice processing apparatus 10 detects, as utterance states, a series of utterances from a start of an utterance to an end thereof by, for example, determining the start, the end, etc. of the utterance. The voice processing apparatus 10 calculates a normalized spectrum in the detected current utterance by normalizing a spectrum for each frame in the current utterance using at least an average spectrum acquired until the present time. The voice processing apparatus 10 generates utterance data indicating utterance content by performing a voice recognition process on the normalized spectrum. The voice processing apparatus 10 outputs the generated utterance data to the output unit 30.

The input unit 20 acquires the audio signal. The input unit 20 includes, for example, a microphone array configured by arranging P (P is an integer of 1 or more) acoustoelectric conversion elements (microphones) at different positions. The input unit 20 outputs a P-channel audio signal generated from an incoming sound by the P acoustoelectric conversion elements to the voice processing apparatus 10. The input unit 20 may transmit a recorded audio signal to the voice processing apparatus 10 in a wireless or wired manner. The input unit 20 may be installed at a fixed position and be installed on a movable body such as a robot or a vehicle to be movable. The input unit 20 may be formed integrally with the voice processing apparatus 10 and as a separate body. Note that the input unit 20 may include a data input interface through which an audio signal from another apparatus is input.

The output unit 30 outputs utterance data input from the voice processing apparatus 10 or information thereof. The output unit 30 includes a display apparatus configured to display, for example, text, a figure, an image, etc. The display apparatus displays information of utterance content indicated by the utterance data in a visible form such as text, an image, etc. Note that the output unit 30 may include a data output interface configured to output utterance data to another apparatus. The output unit 30 may include a data input/output interface configured integrally with the input unit 20.

(Constitution of Voice Processing Apparatus)

Next, a constitution of the voice processing apparatus 10 will be described.

The voice processing apparatus 10 is configured to include a sound source localization unit 101, a sound source tracking unit 102, a sound source separation unit 103, a feature amount acquisition unit 104, an utterance state determination unit 105, an average spectrum calculation unit 106, a spectrum normalization unit 107, and a voice recognition unit 108.

The sound source localization unit 101 determines a sound source direction for each frame of a predetermined length (for example, 20 ms) on the basis of the P-channel audio signal input from the input unit 20 (sound source localization). The sound source localization unit 101 calculates each of spatial spectra indicating power for each direction using, for example, a multiple signal classification (MUSIC) method in the sound source localization. The sound source localization unit 101 determines the sound source direction for each sound source on the basis of the spatial spectrum. To be more specific, the sound source localization unit 101 determines, as a sound source direction, a direction in which power for each direction constituting the spatial spectrum is a maximum and is greater than a predetermined threshold value of the power. The sound source localization unit 101 determines each of sound source directions of a maximum of P-1 sound sources. The sound source localization unit 101 outputs sound source direction information indicating the determined sound source direction for each sound source and the P-channel audio signal to the sound source tracking unit 102.

The sound source direction information and the P-channel audio signal are input to the sound source tracking unit 102 from the sound source localization unit 101. Also, utterance state information indicating an utterance state for each sound source is input to the sound source tracking unit 102 from the utterance state determination unit 105. The sound source tracking unit 102 determines whether there is a current sound source direction of a sound source determined during an utterance which is detected at a current frame within a predetermined range from a previous sound source direction detected from a predetermined number of frames (for example, 3 to 5 frames) before to an immediately previous frame. The sound source tracking unit 102 determines that a sound source determined to be related to the current sound source direction is a sound source continuing from the previous frame, and forms a sound source direction row for each sound source by causing the previous sound source direction to follow the current sound source direction (sound source tracking).

The sound source tracking unit 102 determines a sound source related to a sound source direction determined to be outside of a predetermined range from any previous sound source direction as a new sound source. Thus, it is specified whether the current sound source direction is a sound source direction of a sound source related to any of the sound source direction rows. The sound source tracking unit 102 outputs the sound source direction information indicating the sound source direction for each sound source and the P-channel audio signal to the sound source separation unit 103.

The sound source direction information and the P-channel audio signal are input to the sound source separation unit 103 from the sound source tracking unit 102. The sound source separation unit 103 separates the P-channel audio signal into sound-source-specific audio signals serving as an audio signal for each sound source on the basis of the sound source direction indicated by the sound source direction information. The sound source separation unit 103 uses, for example, a geometric-constrained high-order decorrelation-based source separation (GHDSS) method when separating the P-channel audio signal into the sound-source-specific audio signals. The GHDSS method includes a process of sequentially calculating a separation matrix and calculating a sound source vector by multiplying an input utterance vector having a frequency domain coefficient of an audio signal of each channel as an element by the separation matrix. The separation matrix is a pseudo-inverse matrix of a transfer function matrix having a transfer function at each microphone of the input unit 20 from each sound source as an element. The sound source vector is a vector having a frequency domain coefficient of a sound-source-specific acoustic signal from each sound source as an element. The sound source separation unit 103 minimizes two cost functions such as separation sharpness and a geometric constraint when calculating the separation matrix. The separation sharpness is an index value indicating a degree to which one of the sound sources is incorrectly separated as another sound source. The geometric constraint is an index value indicating a degree of an error of a sound source vector. Hereinafter, a sound-source-specific audio signal of a sound source k in a frame f is indicated as $S_k(f)$. The sound source separation unit 103 outputs each of the separated sound-source-specific audio signals for every sound source to the feature amount acquisition unit 104.

The feature amount acquisition unit 104 calculates each of spectra serving as intensities for each frequency as an utterance feature amount for each frame of a predetermined length with respect to a sound-source-specific audio signal for each sound source input from the sound source separation unit 103. The feature amount acquisition unit 104 outputs the calculated spectrum for each sound source to the average spectrum calculation unit 106 and the spectrum normalization unit 107. Also, the feature amount acquisition unit 104 outputs the sound-source-specific audio signal for each sound source to the utterance state determination unit 105.

The utterance state determination unit 105 determines utterance states for each sound source on the basis of the sound-source-specific audio signal for each sound source of each frame input from the feature amount acquisition unit 104. The utterance state determination unit 105 performs, for example, known voice activity detection (VAD) on the sound-source-specific audio signal for each sound source, determines an utterance state of a frame which is determined to be voice activity to be an utterance, and determines an utterance state of a frame which is determined to be non-voice activity to be a non-utterance. The utterance state determination unit 105 may determine an utterance state of a sound source which is newly determined to be voice activity as an utterance start and determine an utterance state of a sound source which is newly determined to be non-voice activity as an utterance end. The utterance state determination unit 105 determines an utterance state to be an utterance, for example, when power for each frame is greater than a threshold value of predetermined power and the number of zero crossings is within a predetermined range (for example, 300 to 1000 times/1 second). The utterance state determination unit 105 outputs the utterance state information indicating the utterance state for each sound source to the sound source tracking unit 102, the average spectrum calculation unit 106, and the spectrum normalization unit 107.

The spectrum for each sound source from the feature amount acquisition unit 104 and the utterance state information for each sound source from the utterance state determination unit 105 are input to the average spectrum calculation unit 106. The average spectrum calculation unit 106 calculates an average spectrum for each utterance of each sound source on the basis of the utterance state information and store the calculated average spectrum.

For example, an intensity $X_{k-1}'$ for each frequency of a spectrum average related to a previous utterance k−1 immediately before a current utterance k becomes an inter-frame average value of an intensity $X_{k-1}(f)$ for each frequency of a spectrum for each frame f in the previous utterance k−1 shown in Expression (1).

$$X'_{k-1} = \frac{1}{f^E_{k-1} - f^B_{k-1} + 1} \sum_{f=f^B_{k-1}}^{f^E_{k-1}} X_{k-1}(f) \tag{1}$$

In Expression (1), $f_{k-1}^B$ and $f_{k-1}^E$ represent a frame number at a start time point of the previous utterance k−1 and a frame number at an end time point of the previous utterance k−1, respectively.

When average spectrum request information is input to the average spectrum calculation unit 106 from the spectrum normalization unit 107, the average spectrum calculation unit 106 outputs an average spectrum of a utterance previous to a current utterance of a sound source designated by average spectrum request information as a response thereto to the spectrum normalization unit 107. The previous utterance may be, for example, a previous utterance that is an utterance immediately previous to the current utterance and may be an utterance from a predetermined number of times before the current utterance.

The spectrum for each sound source from the feature amount acquisition unit 104 and the utterance state information for each sound source from the utterance state determination unit 105 are input to the spectrum normalization unit 107. The spectrum normalization unit 107 outputs average spectrum request information which instructs a request of an average spectrum in a previous utterance of a sound source in which an utterance state indicated by utterance state information is an utterance at that point in time (at present) to the average spectrum calculation unit 106. The average spectrum in the previous utterance is input to the spectrum normalization unit 107 from the average spectrum calculation unit 106 as a response thereof. The spectrum normalization unit 107 calculates a normalized spectrum by normalizing a spectrum at that point in time using an average spectrum. To be specific, the spectrum normalization unit 107 subtracts an intensity $X_{k-1}'$ of a frequency corresponding to an average spectrum in the previous utterance k−1 from an intensity $X_k(f_c)$ for each frequency of an utterance k in a frame $f_c$ at that point in time.

In other words, an intensity for each frequency of a normalized spectrum related to a current utterance k is represented as $X_k(f_c) - X_{k-1}'$. The spectrum normalization unit 107 outputs a calculated normalized spectrum for the sound source to the voice recognition unit 108.

The voice recognition unit 108 calculates a predetermined utterance feature amount from the normalized spectrum input from the spectrum normalization unit 107. The utterance feature amount includes, for example, a Mel-frequency Cepstrum coefficient (MFCC), a Mel-frequency Log Spectrum (MFLS), etc. The voice recognition unit 108 performs a voice recognition process using the calculated utterance feature amount and a voice recognition model which is stored in the voice recognition unit 108 in advance. The voice recognition model includes an acoustic model and a language model. The acoustic model is used to determine a phoneme sequence constituted by one or more phonemes from the utterance feature amount. The acoustic model includes, for example, a Hidden Markov Model (HMM). The language model is used to determine a phrase constituted by a phoneme sequence. The language model includes, for example, an n-gram.

The voice recognition unit 108 determines a phrase having the highest likelihood among likelihoods obtained by performing calculation on the calculated utterance feature amount using the voice recognition model as a recognized result. The voice recognition unit 108 outputs utterance data indicating the utterance content to the output unit 30 as a recognized result for each sound source.

Figure 2:
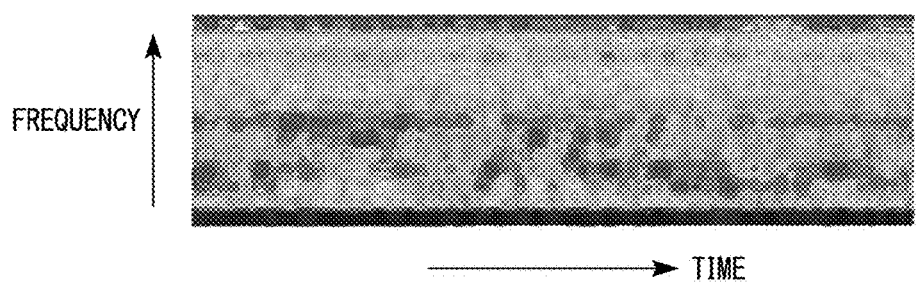
FIG. 2 is a view illustrating an example of spectra of sound-source-specific audio signals separated by a sound source separation unit related to the first embodiment.

FIG. 2 is a view illustrating an example of a spectrum of sound-source-specific audio signals separated by the sound source separation unit 103. FIG. 2 shows temporal variation of a sound-source-specific audio signal spectrum from an utterance start to an utterance end of any utterance. Light and shaded areas represent intensity. A brighter portion indicates a higher intensity, and a darker portion indicates a lower intensity.

Figure 3:
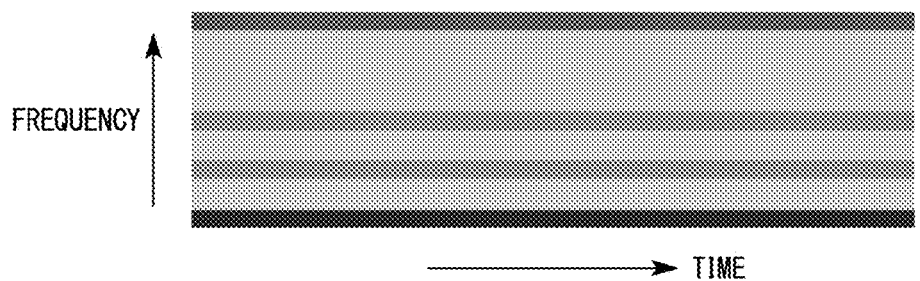
FIG. 3 is a view illustrating an example of an average spectrum calculated by an average spectrum calculation unit related to the first embodiment.

FIG. 3 is a view illustrating an example of an average spectrum calculated by the average spectrum calculation unit 106. The average spectrum is an average spectrum in a previous utterance to the utterance illustrated in FIG. 2. In the horizontal strip pattern shown in FIG. 3, light and shaded areas for each frequency are common in an utterance interval regardless of a time, that is, an intensity is common in the utterance interval.

Figure 4:
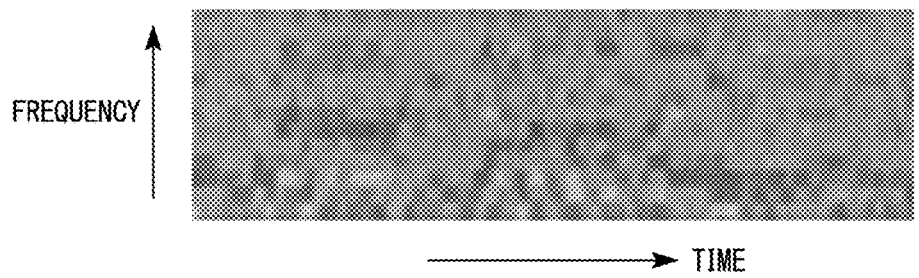
FIG. 4 is a view illustrating an example of a normalized spectrum calculated by a spectrum normalization unit related to the first embodiment.

FIG. 4 is a view illustrating an example of a normalized spectrum calculated by the spectrum normalization unit 107. The normalized spectrum is acquired by performing normalization on the spectrum shown in FIG. 2 using the spectrum shown in FIG. 3. Comparing FIG. 2 with FIG. 4, in the spectrum shown in FIG. 4, stationary background noise is removed through normalization, and temporal variation of a spectrum according to an utterance is remarkable.

(Utterance Process)

Next, an utterance process related to the first embodiment will be described.

Figure 5:
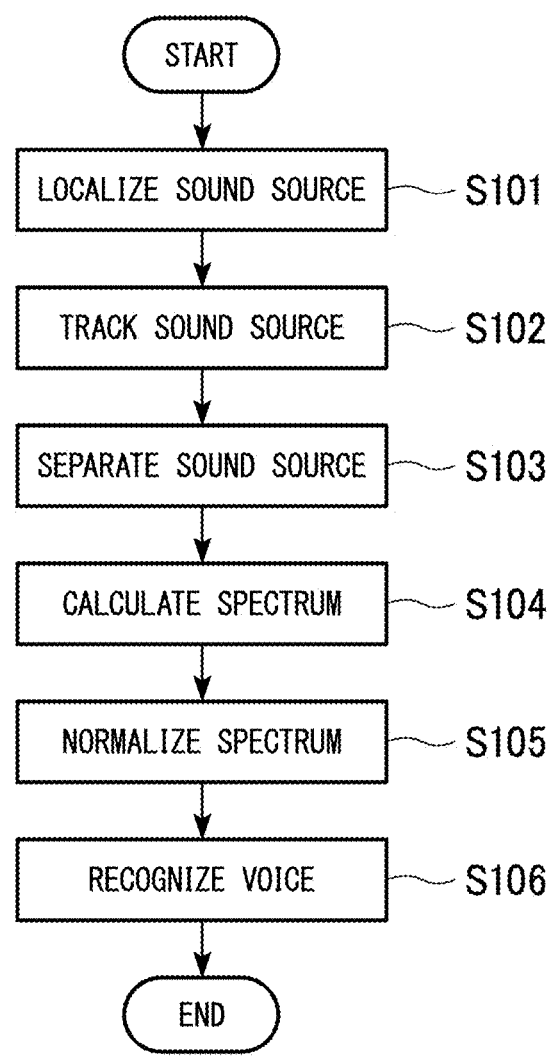
FIG. 5 is a flowchart showing an utterance process related to the first embodiment.

FIG. 5 is a flowchart showing the utterance process related to the first embodiment.

(Step S101) The sound source localization unit 101 determines a sound source direction for each frame on the basis of a P-channel audio signal from the input unit 20. After that, the process proceeds to Step S102.

(Step S102) The sound source tracking unit 102 specifies a sound source direction determined by the sound source localization unit 101 for each sound source determined to be an utterance by the utterance state determination unit 105. After that, the process proceeds to Step S103.

(Step S103) The sound source separation unit 103 separates the P-channel audio signal into sound-source-specific audio signals for every sound source on the basis of the sound source direction for each sound source. After that, the process proceeds to Step S104.

(Step S104) The feature amount acquisition unit 104 calculates a spectrum of the sound-source-specific audio signal for each sound source. After that, the process proceeds to Step S105.

(Step S105) The spectrum normalization unit 107 calculates a normalized spectrum by normalizing a spectrum at that point in time using an average spectrum of a previous utterance calculated by the average spectrum calculation unit 106. The average spectrum calculation unit 106 concurrently calculates an average spectrum for each interval determined to be an utterance for each sound source by the utterance state determination unit 105. After that, the process proceeds to Step S106.

(Step S106) The voice recognition unit 108 generates utterance data by performing a voice recognition process on the calculated normalized spectrum for each sound source and outputs the generated utterance data to the output unit 30. After that, the process illustrated in FIG. 5 ends.

As described above, the voice processing apparatus 10 related to the first embodiment includes the feature amount acquisition unit 104 configured to acquire the spectrum of an audio signal for each frame and the utterance state determination unit 105 configured to determine an utterance state for each frame on the basis of the audio signal. Also, the voice processing apparatus 10 includes the spectrum normalization unit 107 configured to calculate a normalized spectrum in a current utterance by normalizing a spectrum for each frame in the current utterance using at least an average spectrum acquired until the present time.

With such a constitution, components other than a voice, for example, stationary background noise, are removed from the acquired spectrum of the audio signal, and temporal variation of a spectrum according to an utterance is acquired. The voice recognition process is performed on the acquired component so that a time from a start of an utterance to an end of voice recognition can be shortened without impairing voice recognition accuracy.

Also, the spectrum normalization unit 107 uses an average spectrum in the previous utterance as an average spectrum.

With such a constitution, since an average spectrum in an utterance which has already ended is used for normalizing a spectrum at that point in time without waiting for an end of a current utterance, the time taken until voice recognition of the current utterance ends can be shortened.

Also, the spectrum normalization unit 107 uses an average spectrum in a previous utterance that is an utterance immediately previous to a current utterance as the previous utterance.

With such a constitution, since an average spectrum of components other than the voice in a previous utterance closest to a current utterance is used for normalizing the spectrum at that point in time, an error due to variation of the average spectrum over time is reduced. For this reason, deterioration of voice recognition accuracy is suppressed.

Also, the voice processing apparatus 10 related to the first embodiment includes the sound source localization unit 101 configured to determine a sound source direction on the basis of a multi-channel audio signal. The voice processing apparatus 10 includes the sound source separation unit 103 configured to separate a multi-channel audio signal into audio signals for every sound source on the basis of a transfer function from the sound source direction and output a sound-source-specific audio signal to the feature amount acquisition unit.

With such a constitution, components from other directions are removed from a spectrum of a sound-source-specific audio signal from a sound source located in a specific direction. A voice recognition process is performed on a component of temporal variation of a spectrum according to an utterance from the specific direction so that voice recognition accuracy can be further improved.

(Second Embodiment)

Next, a second embodiment of the present invention will be described with reference to the drawings. The same constitutions as in the above-described embodiment are denoted with the same reference numerals, and description thereof is incorporated by reference.

A voice processing system 1A related to the second embodiment is configured to include a voice processing apparatus 10A, the input unit 20, and the output unit 30.

Figure 6:
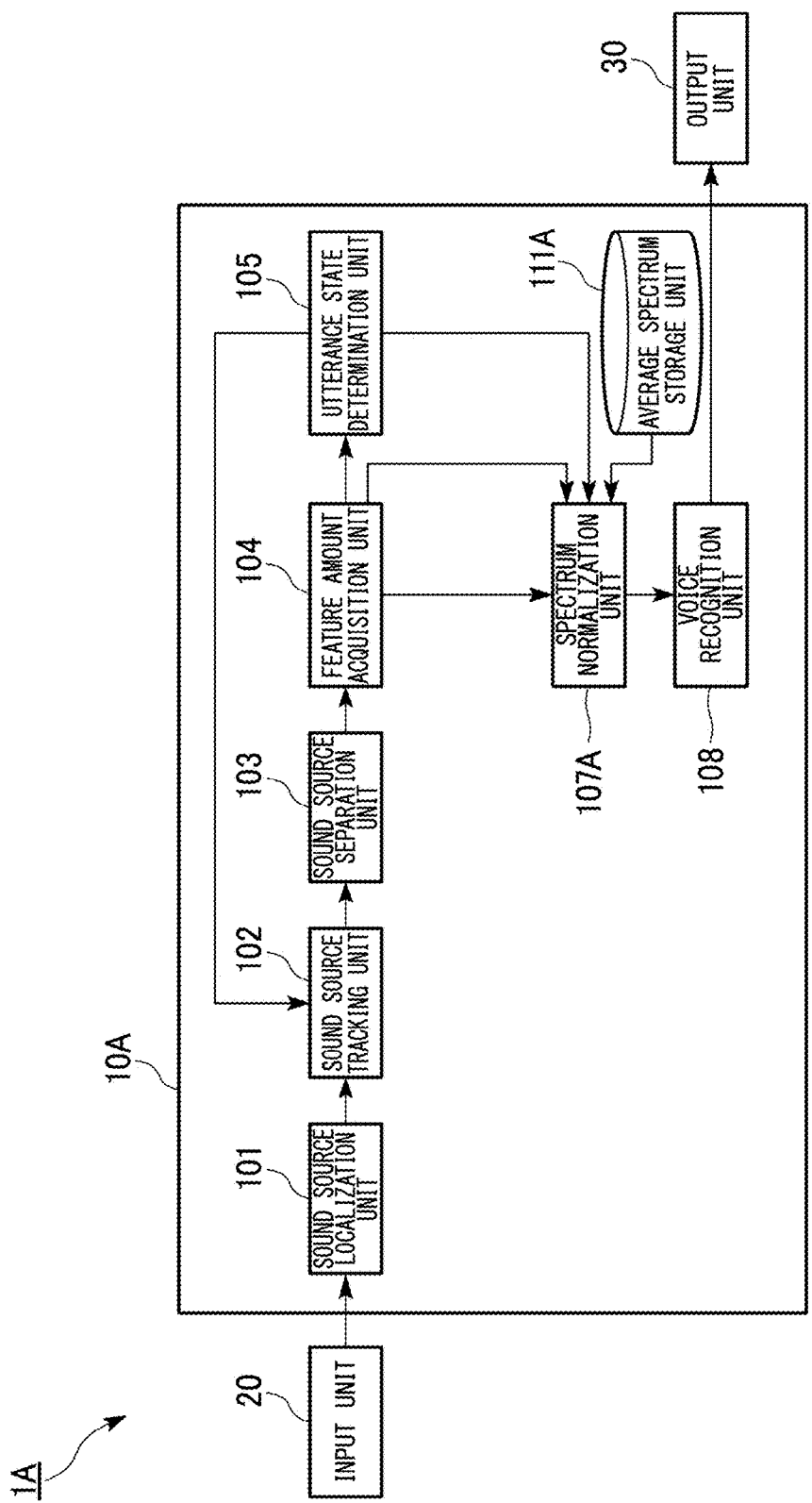
FIG. 6 is a block diagram showing a constitution of a voice processing apparatus related to a second embodiment.

FIG. 6 is a block diagram showing a constitution of the voice processing apparatus 10A related to the second embodiment.

The voice processing apparatus 10A includes an average spectrum storage unit 111A instead of the average spectrum calculation unit 106 and a spectrum normalization unit 107A instead of the spectrum normalization unit 107 in the voice processing apparatus 10 (FIG. 1).

The average spectrum storage unit 111A stores an average spectrum in advance. An average spectrum calculated by averaging a plurality of inter-utterance spectra is acquired as the stored average spectrum. The plurality of inter-utterance spectra may include any one of an inter-utterance spectrum of a specific user, an inter-utterance spectrum in a specific environment, an inter-utterance spectrum of an unspecified user, and an inter-utterance spectrum in an unspecified environment. The inter-utterance spectrum of the specific user may be used when the voice processing apparatus 10A is mainly used only by that user.

The inter-utterance spectrum in the specific environment may be used when the voice processing apparatus 10A is mainly used only in that environment, and the inter-utterance spectrum by the unspecified user may be used when a user of the voice processing apparatus 10A is unspecified. The inter-utterance spectrum in the unspecified environment may be used when an environment in which the voice processing apparatus 10A is used is unspecified.

The spectrum for each sound source from the feature amount acquisition unit 104 and the utterance state information for each sound source from the utterance state determination unit 105 are input to the spectrum normalization unit 107A. The spectrum normalization unit 107A reads an average spectrum from the average spectrum storage unit 111A and calculates a normalized spectrum by normalizing a spectrum which is input at that point in time using the read average spectrum for each sound source in which an utterance state indicated by the utterance state information is determined to be an utterance. An intensity for each frequency of a normalized spectrum related to a current utterance k calculated in the second embodiment is represented as $X_k(f_c) - X_A'$. $X_A'$ indicates an intensity for each frequency of an average spectrum calculated by averaging a plurality of inter-utterance spectra.

The spectrum normalization unit 107A outputs the calculated normalized spectrum of the sound source to the voice recognition unit 108.

(Utterance Process)

Next, an utterance process related to the second embodiment will be described.

Figure 7:
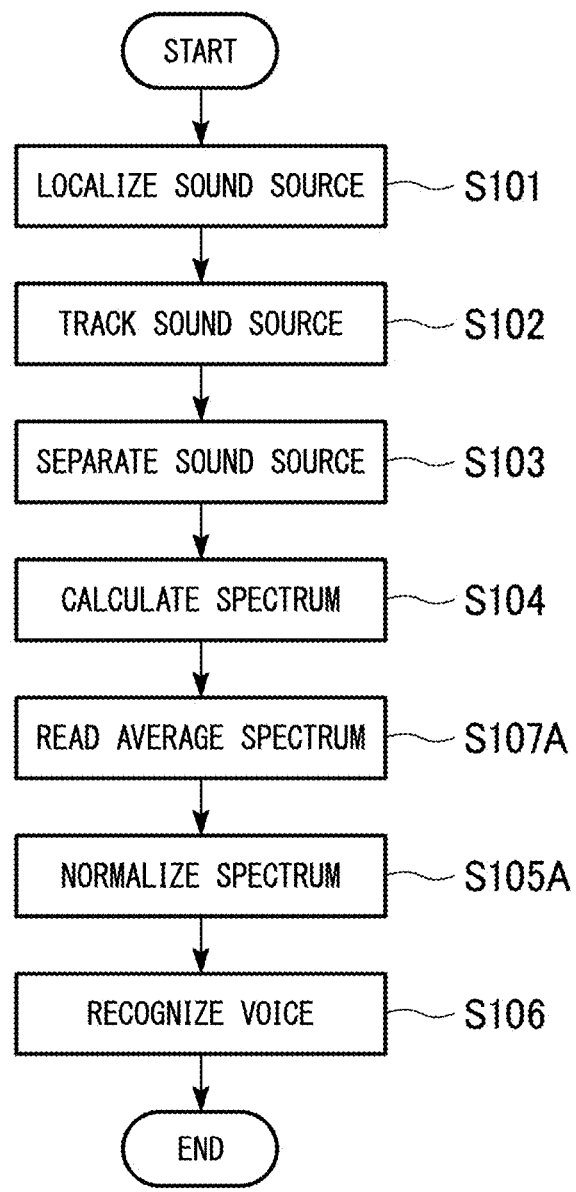
FIG. 7 is a flowchart showing an utterance process related to the second embodiment.

FIG. 7 is a flowchart showing the utterance process related to the second embodiment.

The utterance process illustrated in FIG. 7 includes Step S107A and Step S105A as well as Steps S101 to S104 and Step S106.

In the utterance process illustrated in FIG. 7, after the process of Step S104 ends, the process proceeds to Step S107A.

(Step S107A) The spectrum normalization unit 107A reads an average spectrum which is stored in advance from the average spectrum storage unit 111A. After that, the process proceeds to Step S105A.

(Step S105A) The spectrum normalization unit 107A calculates a normalized spectrum by normalizing a spectrum at that point in time using the read average spectrum for each sound source determined to be an utterance. After that, the process proceeds to Step S106.

As described above, the spectrum normalization unit 107A related to the second embodiment uses an average spectrum of a plurality of utterances which is stored in advance in the average spectrum storage unit 111A.

With such a constitution, since an average spectrum obtained by averaging a variety of acoustic features is used for normalization, deterioration of voice recognition accuracy is suppressed as a whole even if variation in an acoustic feature occurs due to a speaker or the passage of time.

(Third Embodiment)

Next, a third embodiment of the present invention will be described with reference to the drawings. The same constitution as in the above-described embodiments are denoted with the same reference numerals, and description thereof is incorporated by reference.

A voice processing system 1B related to the third embodiment is configured to include a voice processing apparatus 10B, the input unit 20, and the output unit 30.

Figure 8:
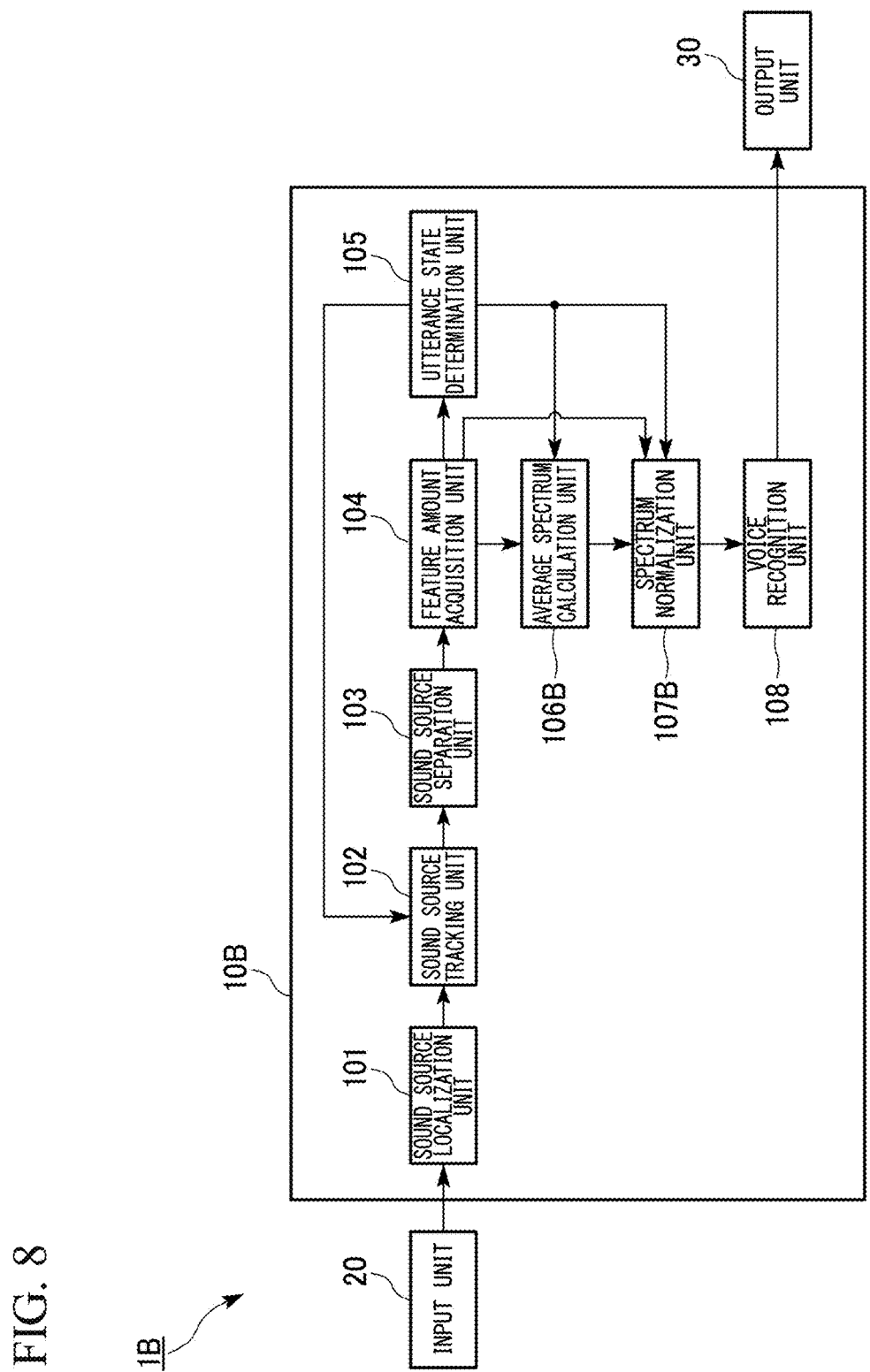
FIG. 8 is a block diagram showing a constitution of a voice processing apparatus related to a third embodiment.

FIG. 8 is a block diagram showing a constitution of the voice processing apparatus 10B related to the third embodiment.

The voice processing apparatus 10B includes an average spectrum calculation unit 106B instead of the average spectrum calculation unit 106 and a spectrum normalization unit 107B instead of the spectrum normalization unit 107 in the voice processing apparatus 10 (FIG. 1).

The spectrum for each sound source from the feature amount acquisition unit 104 and the utterance state information for each sound source from the utterance state determination unit 105 are input to the average spectrum calculation unit 106B. The average spectrum calculation unit 106B sequentially calculates average spectra by averaging spectra from a start time point of an utterance at that point in time (a current utterance) to that point in time with respect to each sound source in which an utterance state indicated by the utterance state information is an utterance.

In other words, an intensity $X_k'$ for each frequency of a spectrum average in a current frame $f_c$ becomes an inter-frame average value of an intensity $X_k(f)$ for each frequency of a spectrum for each frame f from a start time point of a current utterance k to the current frame $f_c$ represented in Expression (2).

$$X_k' = \frac{1}{f_c - f_k^B + 1} \sum_{f=f_k^B}^{f_c} X_k(f) \quad (2)$$

In Expression (2), $f_k^B$ represents a frame number at a start time point of a current utterance k.

The average spectrum calculation unit 106B outputs the calculated average spectrum of each sound source to the spectrum normalization unit 107B.

The spectrum for each sound source from the feature amount acquisition unit 104, the average spectrum for each sound source from the average spectrum calculation unit 106B, and the utterance state information for each sound source from the utterance state determination unit 105 are input to the spectrum normalization unit 107B. The spectrum normalization unit 107B calculates a normalized spectrum by normalizing a spectrum at that point in time from the feature amount acquisition unit 104 using one of the average spectra which are sequentially calculated from the average spectrum calculation unit 106B. The spectrum normalization unit 107B outputs the calculated normalized spectrum of the sound source to the voice recognition unit 108.

(Utterance Process)

Next, an utterance process related to the third embodiment will be described.

Figure 9:
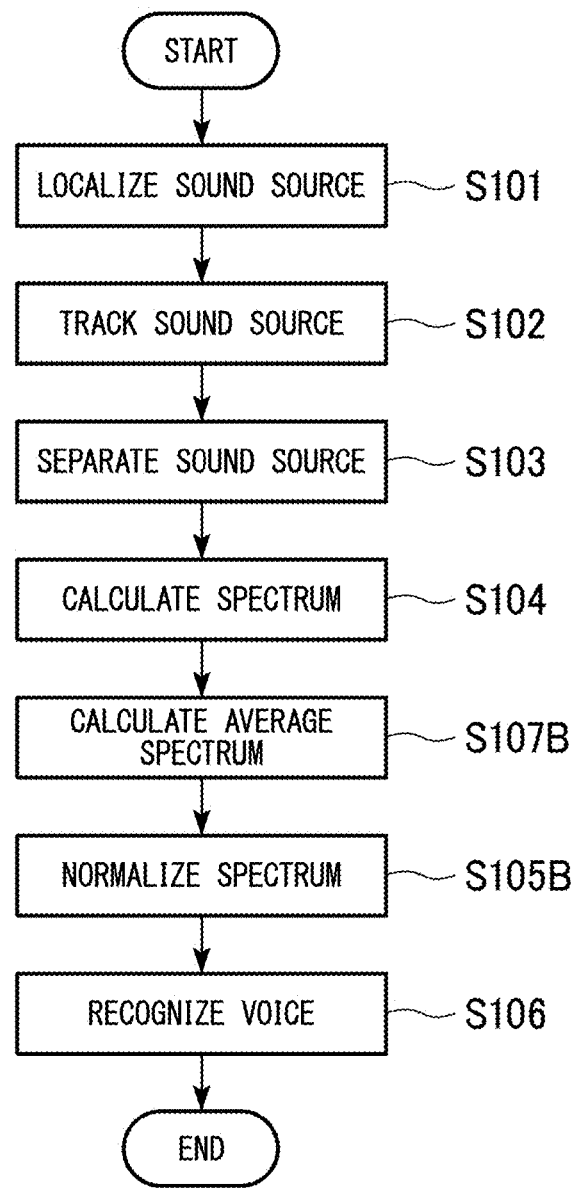
FIG. 9 is a flowchart showing an utterance process related to the third embodiment.

FIG. 9 is a flowchart showing the utterance process related to the third embodiment.

The utterance process illustrated in FIG. 9 includes Step S107B and Step S105B as well as Steps S101 to S104 and Step S106.

In the utterance process illustrated in FIG. 9, after the process of Step S104 ends, the process proceeds to Step S107B.

(Step S107B) The average spectrum calculation unit 106B sequentially calculates average spectra by averaging spectra from a start time point of a current utterance to that point in time with respect to each sound source in which an utterance state in the utterance state determination unit 105 is determined to be an utterance. After that, the process proceeds to Step S105B.

(Step S105B) The spectrum normalization unit 107B calculates a normalized spectrum by normalizing a spectrum at that point in time using the average spectra which are sequentially calculated for each sound source determined to be an utterance in the utterance state determination unit 105. After that, the process proceeds to Step S106.

(Evaluation Experiment)

Next, an evaluation experiment that was conducted to evaluate performance of the voice processing apparatus 10B related to the third embodiment will be described. The evaluation experiment was conducted in a laboratory in which a reverberation time was 1.0 s, and a microphone array having eight microphones embedded in the head of a humanoid robot (not shown) was used as the input unit 20. A position of a sound source was 1.5 m away from the head of the robot and was in a range of 20° to the left to 20° to the right of the front of the robot. Noise was randomly produced separately from the sound source in directions different from the front of the robot and different from each other every time in parallel with this. 824 utterances were used as the sound sources. A sampling frequency of an audio signal, the number of FFTs in one frame when converted into a frequency domain, and a shift length of a frame were 16 kHz, 512, and 160, respectively. Also, in each attempt, a voice recognition process was performed on each utterance. Word interpretation accuracy was acquired by integrating recognized results acquired through the voice recognition process. For the purpose of comparison, the same experiment was conducted on online Spectral Mean Normalization (SMN), the first embodiment, and the second embodiment in addition to the third embodiment. The offline SMN is a technique in which voice recognition is performed on a normalized spectrum obtained by normalizing a spectrum at each point in time using an average spectrum of an utterance at that point in time through an offline process. On the other hand, all of the utterance processes related to the first embodiment, the second embodiment, and the third embodiment can be executed online.

FIG. 10 is a table showing an example of word interpretation accuracy. In FIG. 10, the columns represent the offline SMN, the first embodiment, the second embodiment, and the third embodiment as processing methods. The rows represent a correct word interpretation rate (Acc), a word recognition rate (Corr), a substitution error rate (Sub), a deletion error rate (Del), and an insertion error rate (Ins) as indices of word interpretation accuracy.

The word interpretation accuracy of the process related to the third embodiment is highest among processes which can be executed online, with the process related to the first embodiment and the process related to the second embodiment following. According to the third embodiment, the same performance as the offline SMN is acquired. For example, a correct word interpretation rate of the offline SMN is 80.24%, whereas that of the third embodiment is 80.34%. A word recognition rate of the offline SMN is 85.99%, whereas that of the third embodiment is 84.94%. As a result, the influence of the acoustic environment at that point in time is significantly eliminated through normalization in the third embodiment. Thus, online voice recognition accuracy is improved.

As described above, the spectrum normalization unit 107B related to the third embodiment uses an average spectrum from a start of a current utterance to the present time at normalizing a spectrum at that point in time.

With such a constitution, an average spectrum in an already acquired interval of a current utterance can be acquired as an average spectrum used for normalizing a spectrum at that point in time. For this reason, a time taken until voice recognition of the current utterance ends can be shortened. Also, since an average spectrum of components other than a voice in an utterance until that point in time is used for normalizing the spectrum at that point in time, an error due to variation of an average spectrum over time is further reduced.

For this reason, deterioration of voice recognition accuracy is further suppressed.

Figure 11:
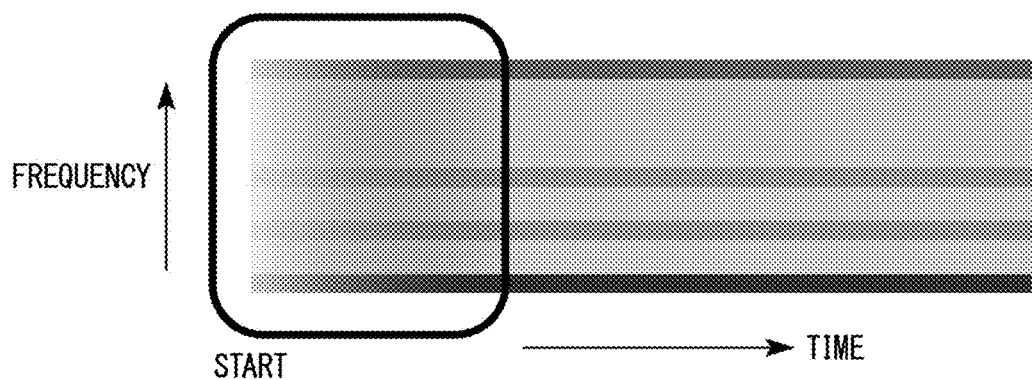
FIG. 11 is a view illustrating another example of an average spectrum.

As described above, the average spectrum calculation unit 106B related to the third embodiment sequentially calculates average spectra by averaging spectra from a start time point of the current utterance to that point in time. However, an average spectrum is not stable in an interval in which an elapsed time from an utterance time of the current utterance is short (for example, within tens of ms) like an interval in a frame border of a beginning part of FIG. 11. An influence of a change of the average spectrum over time on voice recognition accuracy cannot be ignored. A fourth embodiment which will be described below was made in view of this point.

(Fourth Embodiment)

Next, the fourth embodiment of the present invention will be described with reference to the drawings. The same constitutions as in the above-described embodiments are denoted with the same reference numerals, and description thereof is incorporated by reference.

A voice processing system 1C related to the fourth embodiment is configured to include a voice processing apparatus 10C, the input unit 20, and the output unit 30.

Figure 12:
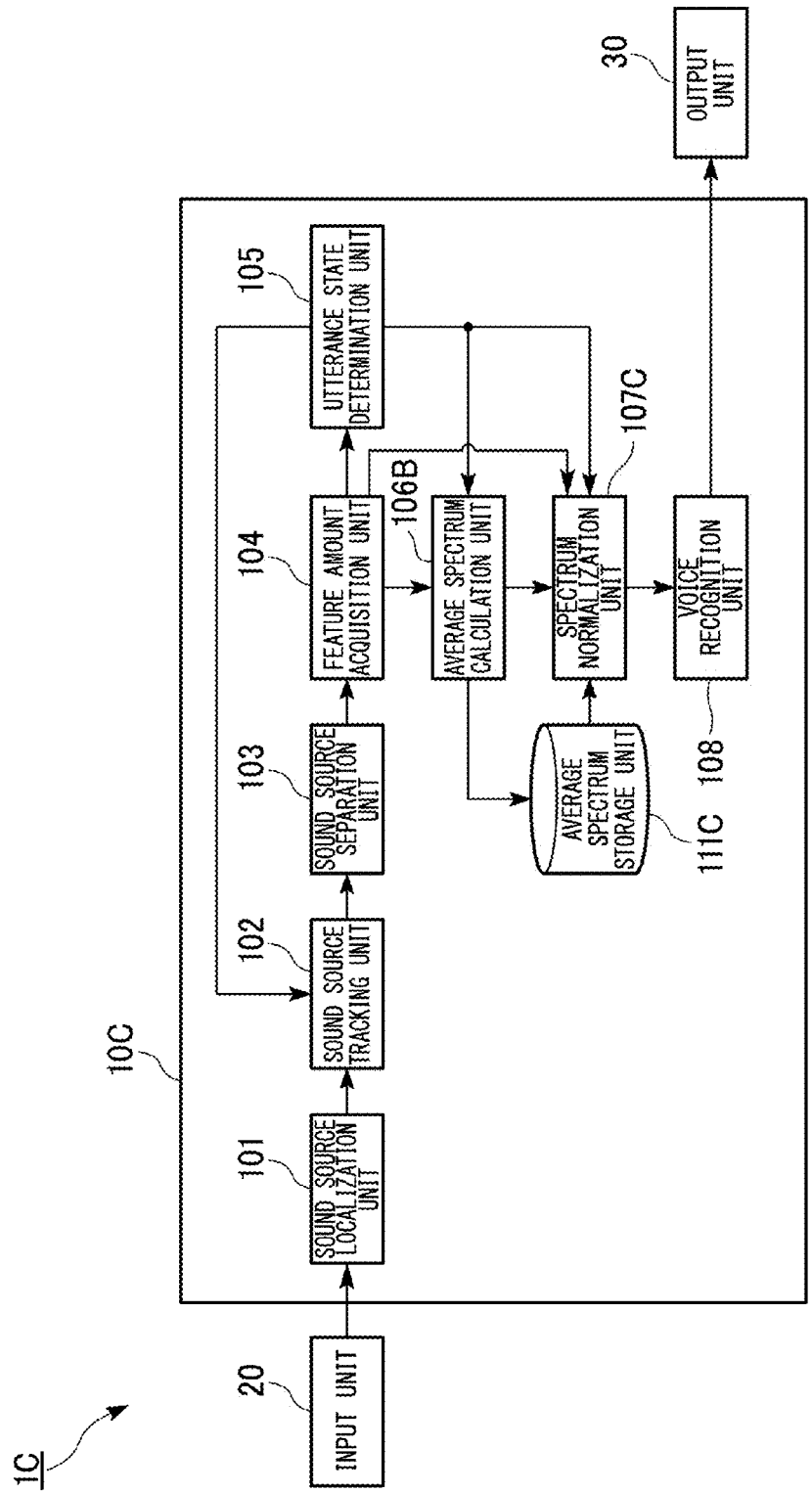
FIG. 12 is a block diagram showing a constitution of a voice processing apparatus related to a fourth embodiment.

FIG. 12 is a block diagram showing a constitution of the voice processing apparatus 10C related to the fourth embodiment.

The voice processing apparatus 10C includes a spectrum normalization unit 107C instead of the spectrum normalization unit 107B and further includes an average spectrum storage unit 111C in the voice processing apparatus 10B (FIG. 8).

The average spectrum storage unit 111C stores an average spectrum in advance. The stored average spectrum is, for example, an average spectrum calculated by averaging a plurality of inter-utterance spectra like the average spectrum storage unit 111A. Also, the stored average spectrum may be a previous average spectrum, for example, an average spectrum of an earlier utterance calculated by the average spectrum calculation unit 106B.

The spectrum for the sound source from the feature amount acquisition unit 104 and the utterance state information from the utterance state determination unit 105 are input to the spectrum normalization unit 107C. The spectrum normalization unit 107C determines whether an elapsed time from a start time point of the current utterance to that point in time exceeds a threshold value (for example, tens of ms) of a predetermined elapsed time with respect to each sound source in which the utterance state indicated by the utterance state information is an utterance. When it is not determined to exceed the threshold value, the spectrum normalization unit 107C reads an average spectrum from the average spectrum storage unit 111C and calculates a normalized spectrum by normalizing a spectrum for each sound source at that point in time using the read average spectrum. When it is determined to exceed the threshold value, the spectrum normalization unit 107C receives each of average spectra which are sequentially calculated from the average spectrum calculation unit 106 with respect to a sound source in which an utterance state indicated by utterance state information at that point in time is an utterance. The spectrum normalization unit 107C calculates a normalized spectrum by normalizing a spectrum for each sound source at that point in time using one of average spectra of corresponding sound sources which are sequentially calculated. The spectrum normalization unit 107C outputs the normalized spectrum of the sound sources which are calculated to the voice recognition unit 108.

To be more specific, the spectrum normalization unit 107C determines whether, for example, a relationship of $f_c - f_k^B \leq f_{Thresh}$ is satisfied. $f_c - f_k^B$ on the left side represents the number of frames from a start time point of a current utterance k to a current frame $f_c$, and $f_{Thresh}$ on the right side represents a predetermined threshold value of the number of frames. An intensity for each frequency of a normalized spectrum calculated when the relationship is determined to be satisfied becomes $X_k(f_c) - X_A'$. An intensity for each frequency of a normalized spectrum calculated when the relationship is not determined to be satisfied becomes $X_k(f_c) - X_k'$.

(Utterance Process)

Next, an utterance process related to the fourth embodiment will be described.

Figure 13:
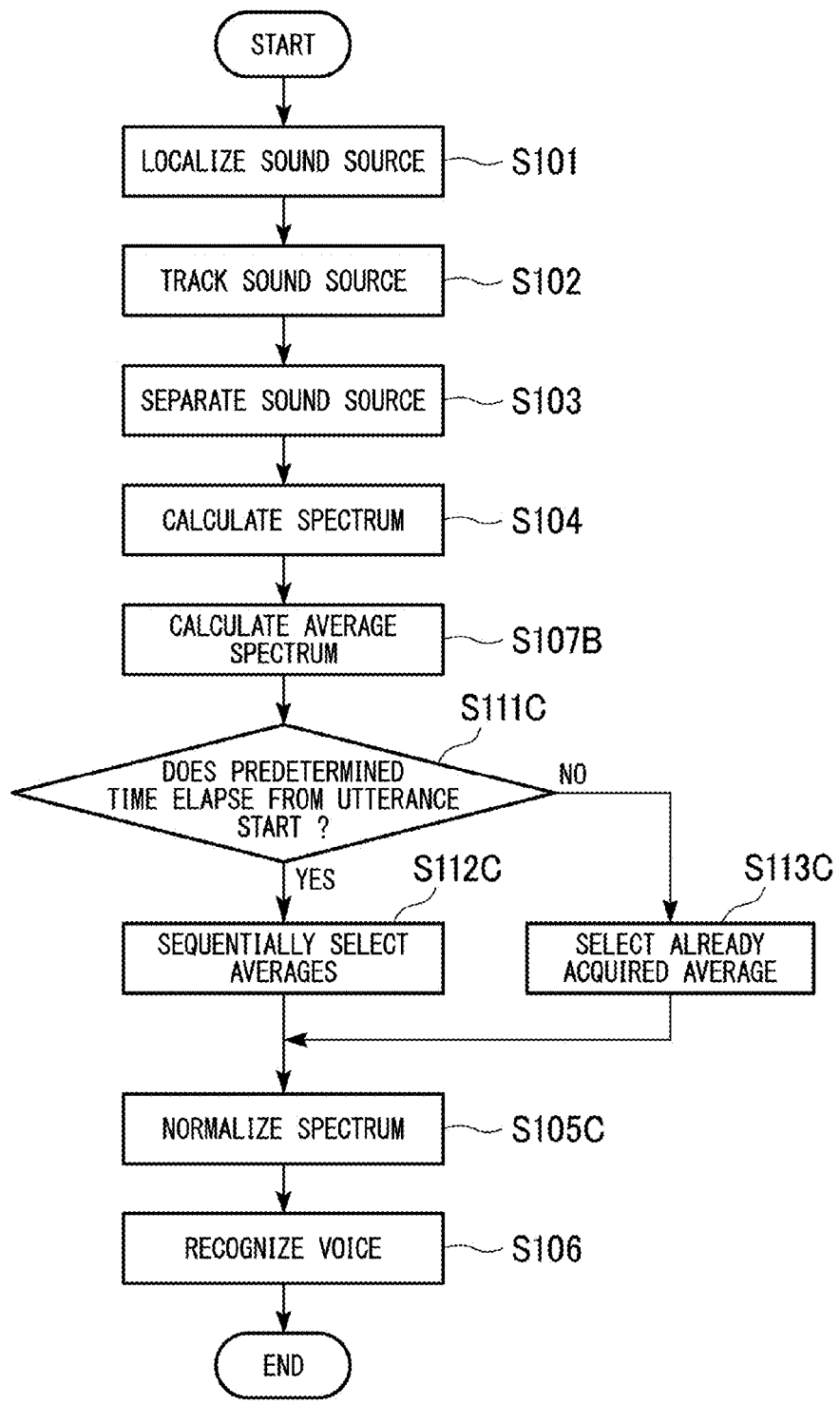
FIG. 13 is a flowchart showing an utterance process related to the fourth embodiment.

FIG. 13 is a flowchart showing the utterance process related to the fourth embodiment.

The utterance process illustrated in FIG. 13 includes Step S107B, Step S105C, and Steps S111C to S113C as well as Steps S101 to S104 and Step S106.

In the utterance process illustrated in FIG. 13, after the process of Step S104 ends, the process proceeds to Step S107B.

(Step S107B) The average spectrum calculation unit 106B sequentially calculates average spectra of sound sources in which an utterance state in the utterance state determination unit 105 is determined to be an utterance by averaging spectra from a start time point of a current utterance to that point in time. After that, the process proceeds to Step S111C.

(Step S111C) The spectrum normalization unit 107C determines whether an elapsed time from a start time point of a current utterance exceeds a predetermined threshold value of the elapsed time with respect to each sound source in which the utterance state in the utterance state determination unit 105 is determined to be an utterance. When it is determined to exceed the threshold value (YES in Step S111C), the process proceeds to Step S112C. When it is not determined to exceed the threshold value (NO in Step S111C), the process proceeds to Step S113C.

(Step S112C) The spectrum normalization unit 107C selects average spectra which are sequentially calculated by the average spectrum calculation unit 106B as an average spectrum used for normalization. After that, the process proceeds to Step S105C.

(Step S113C) The spectrum normalization unit 107C selects an average spectrum read from the average spectrum storage unit 111C as an average spectrum used for normalization. After that, the process proceeds to Step S105C.

(Step S105C) The spectrum normalization unit 107C calculates a normalized spectrum by normalizing a spectrum for each sound source at that point in time using an average spectrum selected in Steps S112C or Step S113C with respect to the corresponding sound source. The spectrum normalization unit 107C outputs the calculated normalized spectrum to the voice recognition unit 108. The process proceeds to Step S106.

As described above, the spectrum normalization unit 107C related to the fourth embodiment uses an average spectrum in the previous utterance to normalize a spectrum at that point in time during a predetermined time from a start of a current utterance instead of an average spectrum from a start of the current utterance until the present time.

With such a constitution, since variation of the average spectrum immediately after an utterance start over time does not occur, a reduction of voice recognition accuracy due to such variation is resolved.

As described above, the average spectrum calculation unit 106C related to a fourth embodiment uses an already acquired average spectrum as an average spectrum used for normalization until an elapsed time from a start time point of a current utterance reaches a predetermined threshold value of the elapsed time. The average spectrum calculation unit 106C uses the average spectrum which is sequentially calculated from the start time point of the current utterance after that point in time. However, a phenomenon (an event) in which an acoustic environment is abruptly changed occurs during an utterance in some cases.

Figure 14:
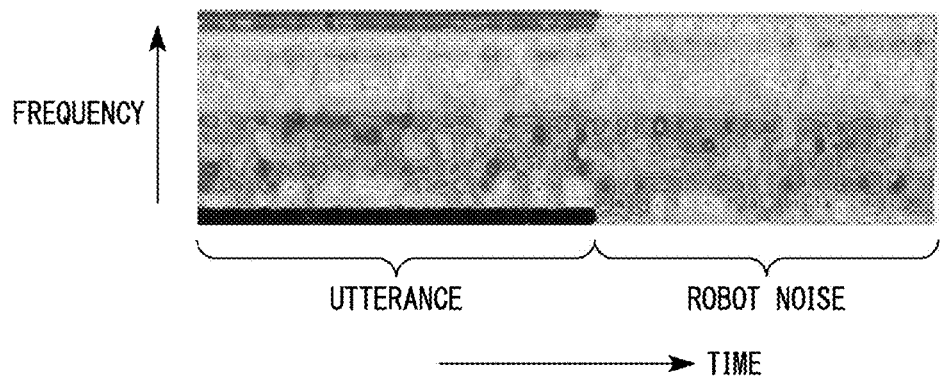
FIG. 14 is a view illustrating an example of a spectrum of an audio signal.
Figure 15:
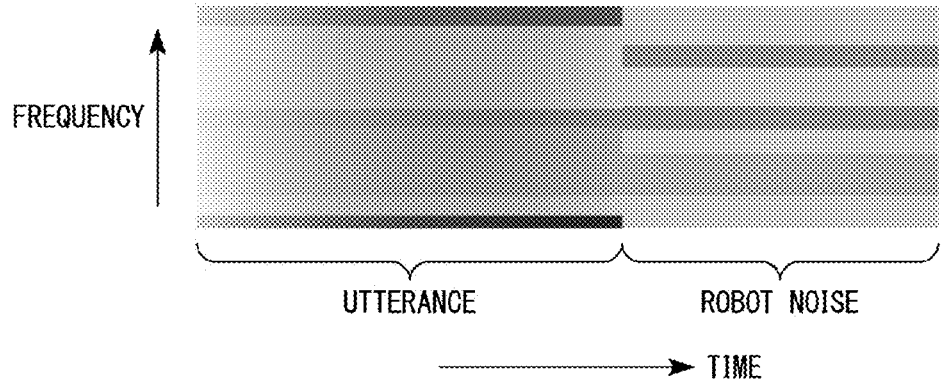
FIG. 15 is a view illustrating another example of an average spectrum.

FIG. 14 illustrates an example of temporal variation of a spectrum of an audio signal input to the voice processing apparatus 10C, exemplifying a case in which an operation sound from operation of a robot (robot noise) occurs as an event occurring during an utterance. Since a spectrum is different before and after an event, an average spectrum after the event occurs is significantly different from an average spectrum from a start time point of an utterance as shown in FIG. 15. For this reason, an influence of a change of an acoustic environment on voice recognition accuracy cannot be avoided in some cases only by properly using the average spectrum used for normalization according to whether an elapsed time from the start time point of the utterance exceeds a predetermined threshold value of the elapsed time. A fifth embodiment which will be described below was made in view of this point.

(Fifth Embodiment)

Next, the fifth embodiment of the present invention will be described with reference to the drawings. The same constitutions as in the above-described embodiments are denoted with the same reference numerals, and description thereof is incorporated by reference.

A voice processing system 1D related to the fifth embodiment is configured to include a voice processing apparatus 10D, the input unit 20, and the output unit 30. A constitution of the voice processing apparatus 10D related to the fifth embodiment will be described below.

Figure 16:
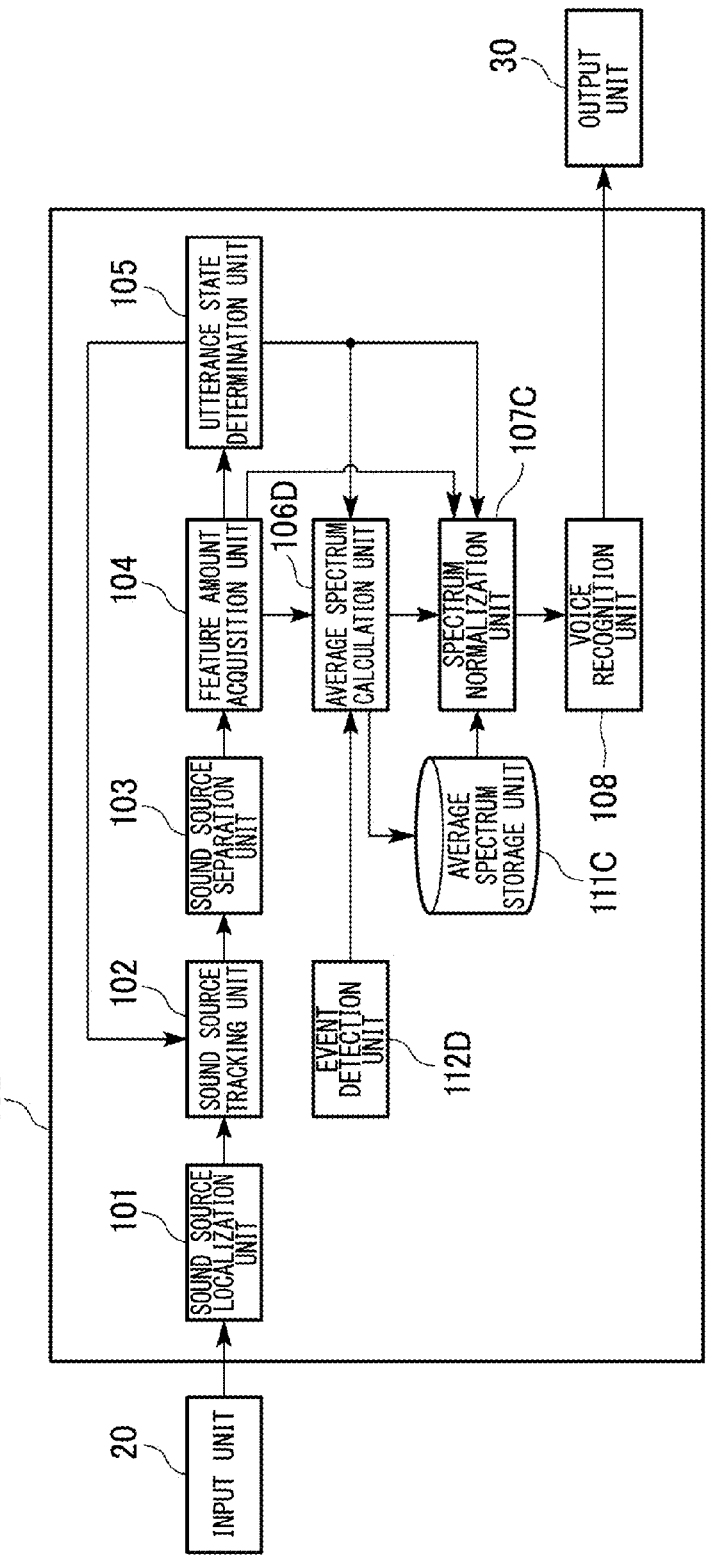
FIG. 16 is a block diagram showing a constitution of a voice processing apparatus related to a fifth embodiment.

FIG. 16 is a block diagram showing a constitution of the voice processing apparatus 10D related to the fifth embodiment.

The voice processing apparatus 10D includes an average spectrum calculation unit 106D instead of the average spectrum calculation unit 106B in the voice processing apparatus 10C (FIG. 12) and further includes an event detection unit 112D.

The event detection unit 112D detects an event which changes an acoustic environment near the voice processing apparatus 10D. Changes of the acoustic environment include phenomena which significantly affect voice recognition accuracy of the voice recognition unit 108 such as occurrence and stop of various operation sounds of apparatuses, environmental sounds, etc., a change of an acoustic feature thereof, a change of a reverberation characteristic or a transfer characteristic from a sound source (even if the event is an utterance voice). The event detection unit 112D outputs event detection information indicating event detection to the average spectrum calculation unit 106D. Note that the event detection unit 112D may detect an event which changes a surrounding acoustic environment using predetermined acoustic feature amounts used for the voice recognition process, for example, change amounts of one or both of the MFCC and the MFLS greater than a predetermined change amount. The acoustic feature amounts can be calculated from a sound-source-specific audio signal of the feature amount acquisition unit 104 which is acquired by the sound source separation unit 103.

The average spectrum calculation unit 106D sequentially calculates average spectra by averaging spectra from a start time point of a current utterance to that point in time with respect to each sound source in which an utterance state indicated by utterance state information from the utterance state determination unit 105 is an utterance like the average spectrum calculation unit 106B.

Here, the average spectrum calculation unit 106D rejects (resets) the calculated averaged spectrum when event detection information is input to the average spectrum calculation unit 106D from the event detection unit 112D, and calculation of an average spectrum is resumed. Therefore, the average spectrum calculation unit 106D sequentially calculates average spectra $X_k'$ of sound sources until that point in time after utterance starts or an event is detected. In other words, in the fifth embodiment, a frame of a start time point in an average interval of an average spectrum Xk' becomes a frame at a start time point of a current utterance k (when an event is not detected) or a frame immediately after an event is detected (when an event in the current utterance k is detected) with respect to an intensity Xk(fc)−Xk' for each frequency of a normalized spectrum calculated by the spectrum normalization unit 107C. The average spectrum calculation unit 106D outputs the calculated average spectrum of each sound source to the spectrum normalization unit 107C.

(Utterance Process)

Next, an utterance process related to the fifth embodiment will be described.

Figure 17:
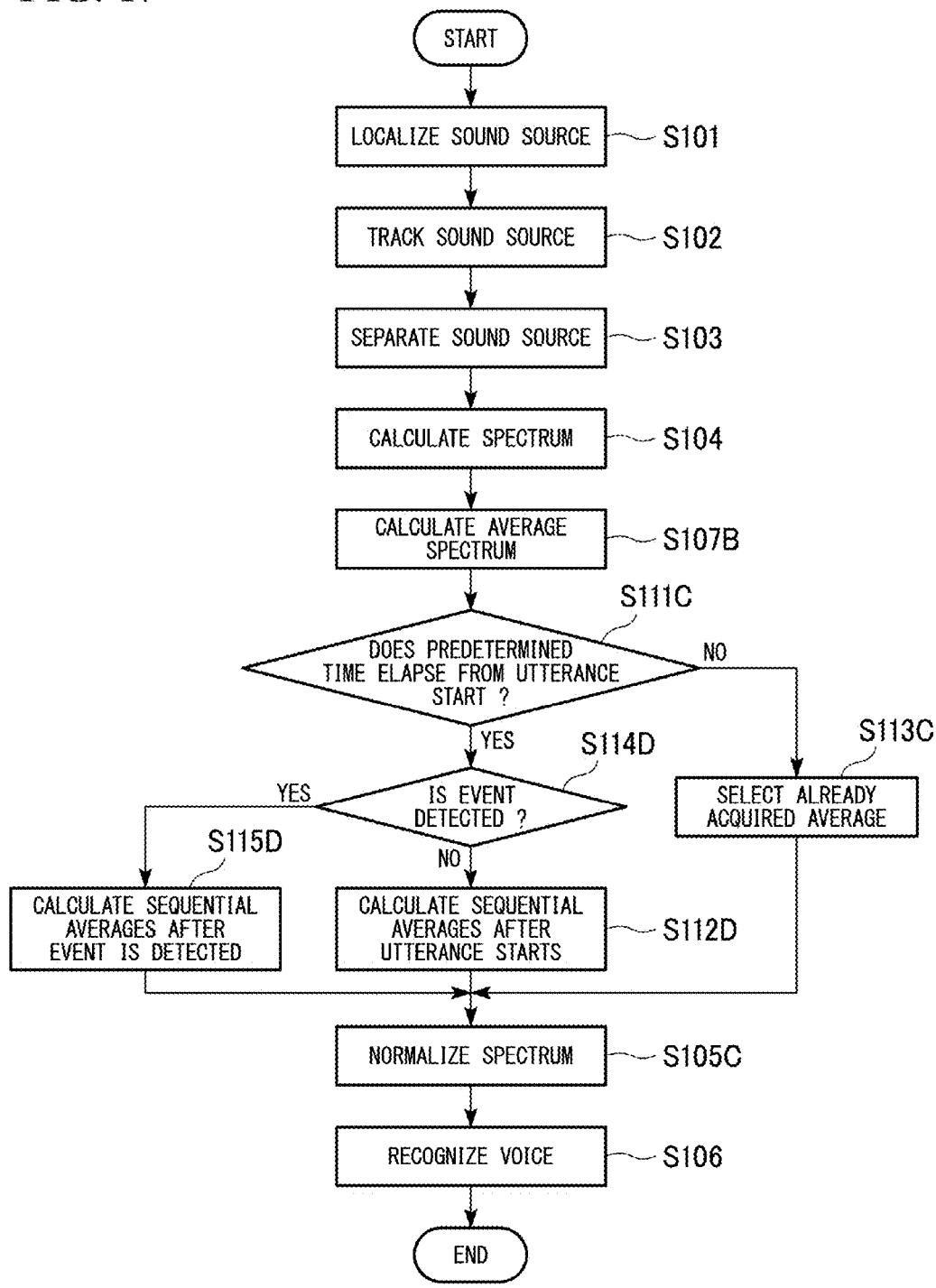
FIG. 17 is a flowchart showing an utterance process related to the fifth embodiment.

FIG. 17 is a flowchart showing the utterance process related to the fifth embodiment.

The utterance process illustrated in FIG. 17 includes Steps S101 to S104, Step S106, Step S107B, Step S105C, Step S111C, Step S113, Step S112D, Step S114D, and Step S115D.

In Step S111C of the utterance process illustrated in FIG. 17, a process of the spectrum normalization unit 107C proceeds to Step S114D when an elapsed time from a start time point of a current utterance is determined to exceed a predetermined threshold value of the elapsed time (YES in Step S111) with respect to a sound source in which an utterance state is an utterance in the utterance state determination unit 105.

(Step S114D) The event detection unit 112D determines whether an event which changes a surrounding acoustic environment of the voice processing apparatus 10D is detected. When it is determined to be detected (YES in Step S114), the process proceeds to Step S115D. When it is not determined to be detected (NO in Step S114), the process proceeds to Step S112D.

(Step S112D) The average spectrum calculation unit 106D sequentially calculates average spectra of sound sources until that point in time after an utterance starts. The spectrum normalization unit 107C selects one of average spectra which are sequentially calculated by the average spectrum calculation unit 106B until that point in time after the utterance starts as an average spectrum used for normalization. After that, the process proceeds to Step S105C.

(Step S115D) The average spectrum calculation unit 106D resumes calculation of an average spectrum. The spectrum normalization unit 107C selects one of the average spectra which are sequentially calculated by the average spectrum calculation unit 106B until that point in time after the utterance starts as the average spectrum used for normalization. After that, the process proceeds to Step S105C.

Figure 18:
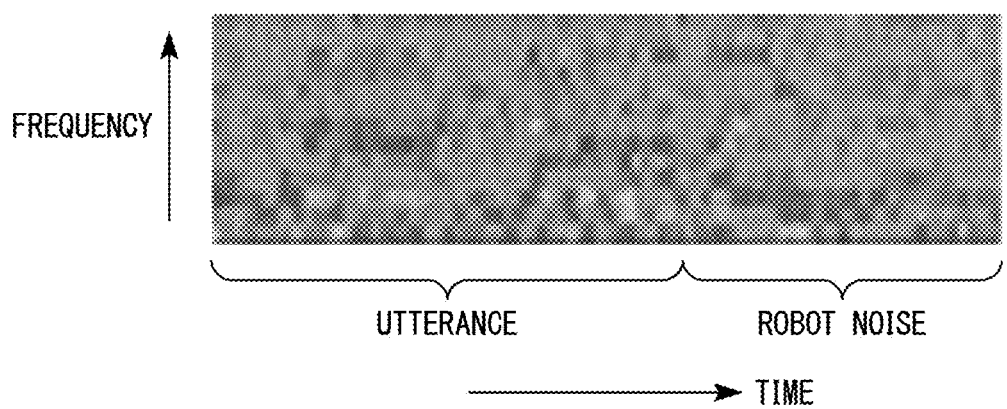
FIG. 18 is a view illustrating another example of a normalized spectrum.

Therefore, the spectrum normalization unit 107C can calculate normalized spectra obtained by normalizing the sequentially calculated spectra using an average spectrum from a point in time at which an event which changes an acoustic environment is detected to that point in time. For this reason, even after the event has been detected, an environmental noise component is sufficiently cancelled through normalization. FIG. 18 is a view illustrating another example of a normalized spectrum. In this example, an intensity for each frequency within an interval extending from before to after an operation sound of the robot is represented as an event by light and shaded areas. In the example illustrated in FIG. 18, a clear change in intensity before and after the event is not acknowledged as in the spectrum at that point in time shown in FIG. 14 and the average spectrum.

This means that a component due to environmental noise such as an operation sound of the robot is sufficiently suppressed over the entire frequency band through normalization using an average spectrum after an event is detected. Therefore, the voice processing apparatus 10D related to the fifth embodiment can improve voice recognition performance even if an event which changes an acoustic environment is detected.

MODIFIED EXAMPLE 1

The voice processing apparatus 10D related to the fifth embodiment can be modified and implemented as follows.

Figure 19:
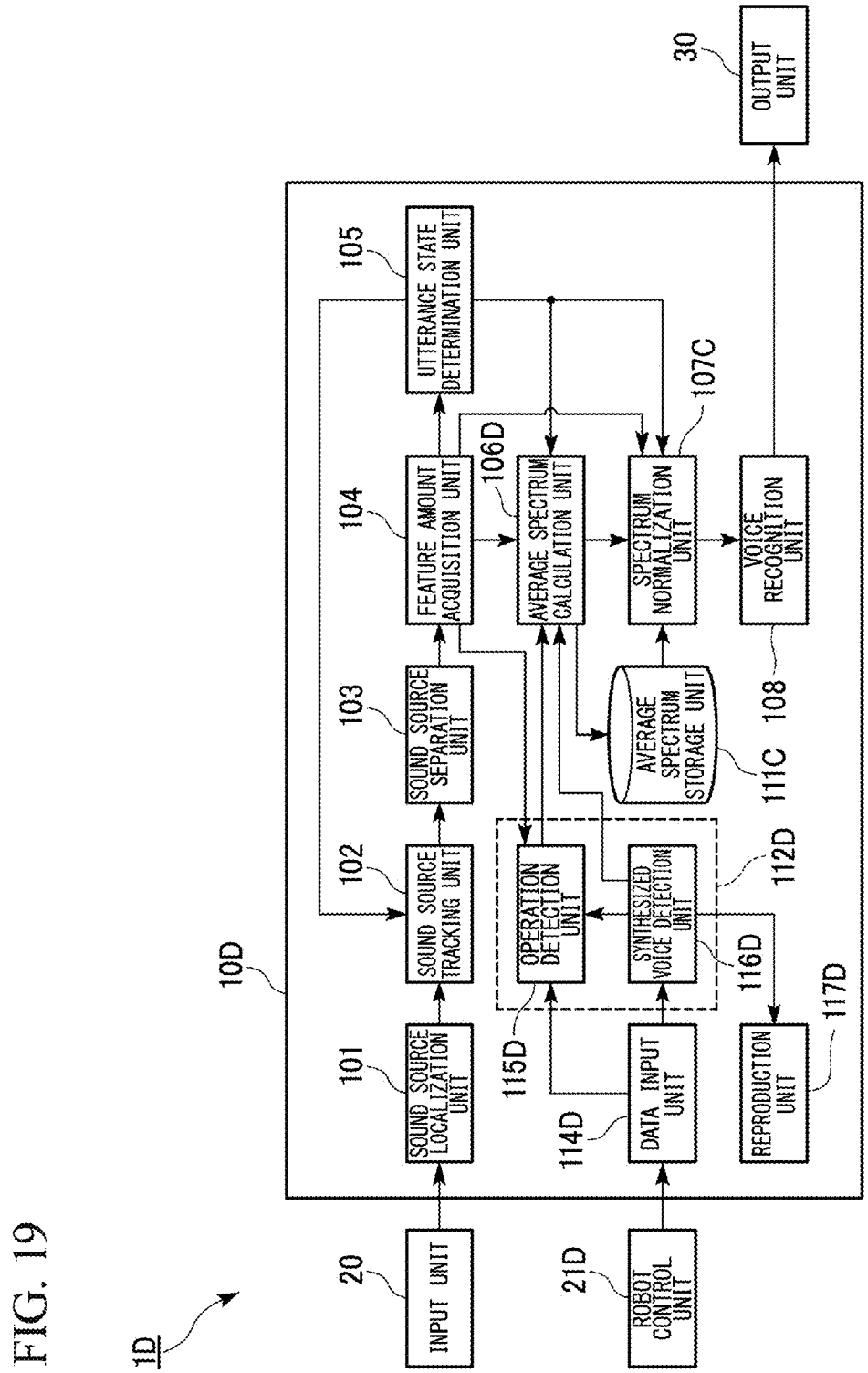
FIG. 19 is a block diagram showing a constitution of one modified example of the fifth embodiment.

FIG. 19 is a block diagram showing a constitution of modified example 1 of the voice processing system 1D related to the fifth embodiment. The voice processing system 1D is configured to include a voice processing apparatus 10D, the input unit 20, a robot control unit 21D, and the output unit 30.

The voice processing system 1D shown in FIG. 19 is mounted on the robot (not shown). The input unit 20 is stored in a head of the robot, and the output unit 30 is installed at a chest of the robot. The voice processing apparatus 10D and the robot control unit 21D are built in a main body of the robot.

The robot control unit 21D controls operation of the robot and outputs various signals acquired at the time of the operation to the voice processing apparatus 10D. To be more specific, the robot control unit 21D includes a sensor (an encoder) configured to measure an angular position of each of joints driven by a driving unit (a motor) and generates an operation signal indicating each measured angular position. The robot control unit 21D also generates a synthesized voice signal indicating a synthesized voice. The robot control unit 21D outputs the generated operation signal and the synthesized voice signal to the voice processing apparatus 10D.

The voice processing apparatus 10D shown in FIG. 19 is configured to further include a data input unit 114D and a reproduction unit 117D in the voice processing apparatus 10D shown in FIG. 16. Also, the event detection unit 112D is configured to include an operation detection unit 115D and a synthesized voice detection unit 116D.

The data input unit 114D outputs an operation signal input from the robot control unit 21D to the operation detection unit 115D and outputs the synthesized voice signal to the synthesized voice detection unit 116D.

The operation detection unit 115D detects a start of operation of the robot as an event when a state in which an input of an operation signal from the data input unit 114D is not detected is changed to a state in which the operation signal is input. Also, the start of operation of the robot may be detected as an event when a state in which an absolute value of a signal value of an operation signal input from the data input unit 114D is smaller than a predetermined threshold value of the signal value is changed to a state in which the signal value of the operation signal is greater than the threshold value. The operation detection unit 115D outputs event detection information indicating the detected start of the operation of the robot to the average spectrum calculation unit 106D. Therefore, when the operation of the robot is started, an operation sound thereof is also newly generated. A spectrum of a sound-source-specific audio signal is normalized using an average spectrum related to an operation sound generated after that point in time with the operation start of the robot as a trigger.

The synthesized voice detection unit 116D detects a generation (an utterance) start of a synthesized voice as an event when a state in which an input of a synthesized voice signal from the data input unit 114D is not detected is changed to a state in which the synthesized voice signal is input. Also, the generation start of the synthesized voice may be detected as an event when a state in which an absolute value of a signal value of a synthesized voice signal input from the data input unit 114D is smaller than a predetermined threshold value of the signal value is changed to a state in which the signal value of the synthesized voice signal is greater than the threshold value. The synthesized voice detection unit 116D outputs event detection information indicating the detected generation start of the synthesized voice to the average spectrum calculation unit 106D. Spectra of sound-source-specific audio signals calculated at all such times are normalized using an average spectrum related to a synthesized voice generated after that point in time with the generation start of the synthesized voice as a trigger. The synthesized voice detection unit 116D outputs the input synthesized voice signal to the reproduction unit 117D.

The reproduction unit 117D reproduces the synthesized voice based on the synthesized voice signal input from the synthesized voice detection unit 116D. The reproduction unit 117D is configured to include, for example, a speaker.

Note that, in this embodiment, the operation detection unit 115D may estimate a component of a sound related to the detected event and calculate a spectrum of the estimated sound. In this case, the average spectrum calculation unit 106D may calculate an average spectrum of a sound related to the detected event and normalize a spectrum of a sound-source-specific audio signal from a sound source related to the event using the calculated average spectrum. For example, when an event is operation of the robot, the operation detection unit 115D can determine a position of an operation mechanism other than the motor as a sound source on the basis of the operation signal input from the data input unit 114D. Position data indicating a position of the input unit 20 has already been set so that the operation detection unit 115D can specify a sound-source-specific sound source signal related to an operation sound among sound-source-specific sound source signals for every sound source according to the sound source separation unit 103 by referring to an operation signal and position data. The operation detection unit 115D may determine an average spectrum of a spectrum of an audio signal of an operation sound estimated using a self-noise estimation method disclosed in Japanese Unexamined Patent Application, First Publication No. 2013-20252 as an average spectrum used for normalization.

The above-described self-noise estimation method is a technique including the following steps.

(S1-1) The operation detection unit 115D calculates a power spectrum of a spectrum of a sound-source-specific audio signal of a corresponding sound source calculated by the feature amount acquisition unit 104 and calculates a stationary noise level on the basis of the calculated power spectrum. For example, a histogram-based recursive level estimation (HRLE) method can be used as a technique of calculating the stationary noise level.

(S1-2) When the utterance state determination unit 105 determines that an utterance state of the corresponding sound source is not utterance, the operation detection unit 115D calculates an audio component gain of the sound-source-specific sound source signal on the basis of the power spectrum calculated in (S1-1) and a noise power spectrum.

(S1-3) The operation detection unit 115D calculates an estimation target spectrum by multiplying the spectrum of the sound-source-specific audio signal by the calculated audio component gain. When the utterance state is not utterance, the estimation target spectrum is a spectrum of a non-stationary noise component in which the stationary noise component is removed.

(S1-4) When the utterance state is determined to be an utterance, the operation detection unit 115D calculates a spectrum of an audio sound of an operation sound by adding the stationary noise level and a non-stationary noise level. The calculated spectrum is used as a spectrum used for normalization. When the utterance state is an utterance, the estimation target spectrum is a spectrum of a superimposed component obtained by superimposing the non-stationary noise component and the audio component.

(S1-5) The operation detection unit 115D calculates an index value, for example, a distance, indicating a gap of each of feature vectors stored in a storage unit (not shown) included in the operation detection unit 115D with a feature vector indicated by one of the input operation signals. The feature vector is a vector including the above-described angular position of each of the joints as an element. The operation detection unit 115D associates the feature vector indicated by the input operation signal with the calculated spectrum of the non-stationary noise component and stores the association in the storage unit when a minimum distance among the calculated distances is greater than a predetermined threshold value of the distance. Thus, a template which gives a correspondence relationship between the operation signal and the non-stationary noise component is added.

(S1-6) The operation detection unit 115D calculates, as a new feature vector, a sum of a feature vector which gives the minimum distance and one of multiplication values obtained by calculating weight coefficients with respect to feature vectors indicated by the input operation signals when the minimum distance is equal to or less than the predetermined threshold value of the distance. The weight coefficients are positive real numbers of 1 or less, and a total value thereof is 1. The operation detection unit 115D substitutes the feature vector which gives the minimum distance by the new calculated feature vector and stores the substitution result in the storage unit (a template update).

Note that, in this modified example, the synthesized voice detection unit 116D may also estimate a component of the generated synthesized voice as a component of a sound related to the detected event and calculate a spectrum of the estimated sound. Even in that case, the average spectrum calculation unit 106D may calculate an average spectrum of the sound related to the detected event and normalize a spectrum of a sound-source-specific audio signal from a sound source related to the event using the calculated average spectrum. Position data indicating a relative position of the reproduction unit 117D to the input unit 20 has already been set so that the synthesized voice detection unit 116D can identify a sound-source-specific sound source signal related to the synthesized voice and sound-source-specific sound source signals related to other sound sources from the sound-source-specific sound source signal acquired by the sound source separation unit 103 by referring to the position data.

The synthesized voice detection unit 116D calculates a transfer function from the reproduction unit 117D to the input unit 20 for each frequency using a known transfer function estimation method on the basis of the sound-source-specific sound source signal related to one of other sound sources (for example, an utterance voice) and the input synthesized voice signal. The synthesized voice detection unit 116D calculates a component of a synthesized voice signal superimposed on the sound-source-specific sound source signal related to the other sound source by multiplying the calculated transfer function by a spectrum related to the other sound source as a spectrum used for normalization.

MODIFIED EXAMPLE 2

The voice processing apparatus 10D related to the fifth embodiment can also be modified and implemented as follows.

Figure 20:
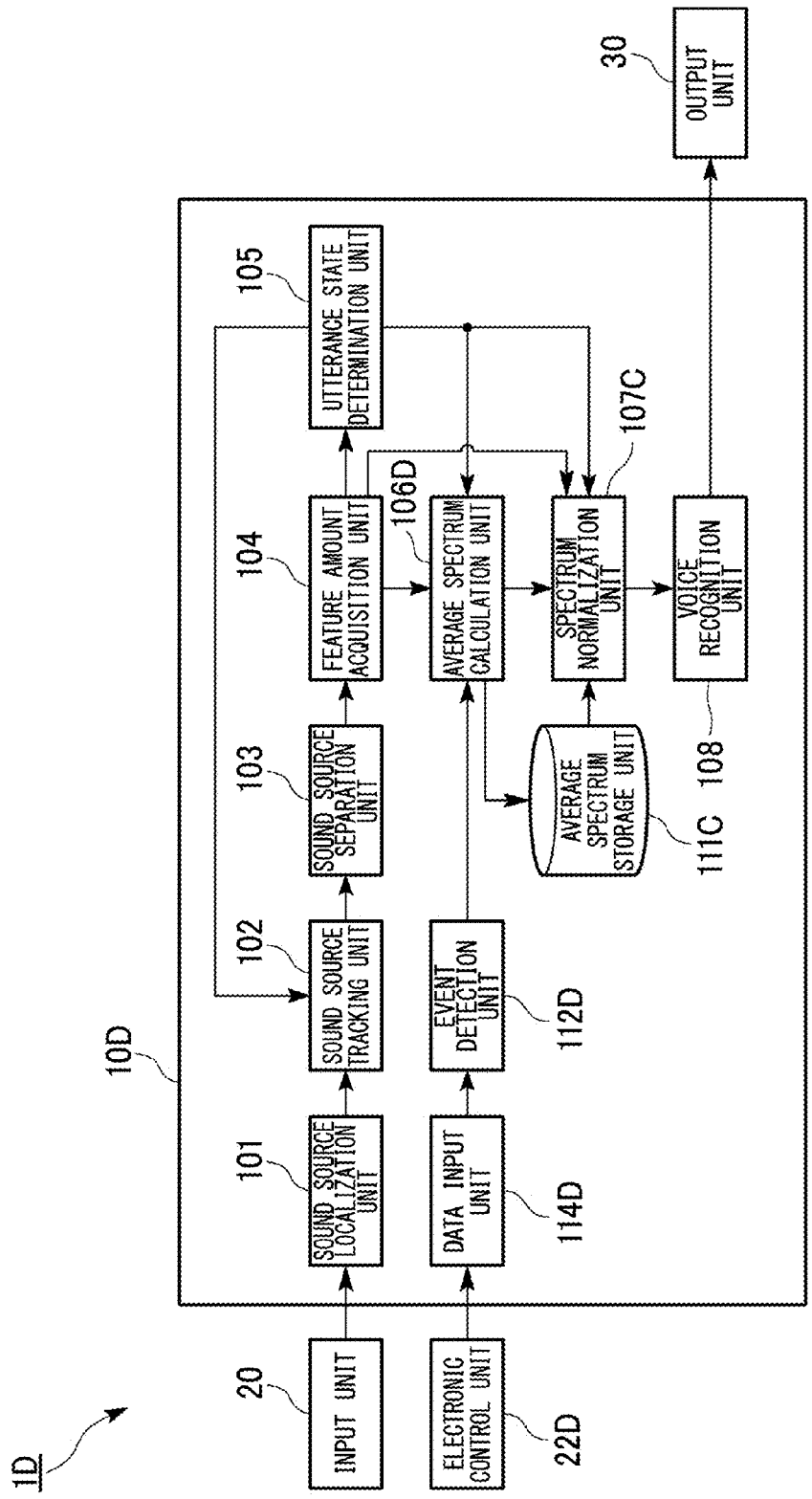
FIG. 20 is a block diagram showing a constitution of another modified example of the fifth embodiment.

FIG. 20 is a block diagram showing a constitution of modified example 2 of the voice processing system 1D related to the fifth embodiment. The voice processing system 1D is configured to include the voice processing apparatus 10D, the input unit 20, an electronic control unit (ECU) 22D, and the output unit 30.

The voice processing system 1D shown in FIG. 20 is installed in the interior of a vehicle (not shown). The input unit 20 and the output unit 30 are installed at the front thereof in front of a seated position of an occupant, for example, a driver's seat. The voice processing apparatus 10D and the electronic control unit 22D are installed at, for example, a dashboard at a lower part in front of the driver's seat. The voice processing apparatus 10D and the electronic control unit 22D are connected to a controller area network (CAN) and can mutually transmit and receive a variety of data.

The electronic control unit 22D controls operation of various operation mechanisms according to operation inputs. Operation mechanisms such as, for example, an opening/closing mechanism of a power window, an opening/closing mechanism of a door, and an operation mechanism of a wiper which generate operation sounds due to operation are included among the operation mechanisms. The electronic control unit 22D generates operation state signals indicating an operation mechanism related to control and operation thereof and outputs the generated operation state signals to the voice processing apparatus 10D.

The event detection unit 112D of the voice processing apparatus 10D detects, as an event, a start of operation of the operation mechanism when a state is changed from a state in which an input of the operation state signal input from the electronic control unit 22D via the data input unit 114D is not detected to a state in which the corresponding operation state is input. The event detection unit 112D outputs event detection information indicating the detected start of the operation of the operation mechanism to the average spectrum calculation unit 106D. Therefore, when the operation of the operation mechanism is started, an operation sound thereof is also newly generated. A spectrum of a sound-source-specific audio signal is normalized using an average spectrum related to an operation sound generated after that point in time with the operation start of the operation mechanism as a trigger.

Note that, even in this modified example, the event detection unit 112D may estimate the spectrum of the operation sound generated by the operation mechanism using the above-described self-noise estimation method and determine the average spectrum of the estimated spectrum as an average spectrum used for normalization.

Note that, in the voice processing apparatus 10D related to the fifth embodiment and the voice processing apparatus 10D related to modified examples 1 and 2, cases in which the event detection unit 112D mainly detects a predetermined start of operation as generation of an event have been exemplified, but the present invention is not limited thereto. The event detection unit 112D may detect an end of operation as the event. For example, a stop of operation of a robot or an operation mechanism, a stop of a synthesized voice, etc. may be detected as the event. A spectrum of a sound-source-specific audio signal is normalized using an average spectrum that does not have an operation sound which occurs no longer after that point in time with one of the stops of operation as a trigger.

As described above, the voice processing apparatus 10D related to the fifth embodiment includes the event detection unit 112D configured to detect an event which changes an acoustic environment. The spectrum normalization unit 107C uses an average spectrum after the event is detected as an average spectrum until the present time.

With such a constitution, the average spectrum used for normalizing the spectrum at that point in time is reset with the detection of the event. For this reason, a reduction of voice recognition accuracy due to a change of an acoustic environment caused by the event can be avoided.

Also, the event detection unit 112D detects a sound related to the event, for example, an operation sound, and the spectrum normalization unit 107C uses an average spectrum of a sound detected by the event detection unit 112D as the average spectrum until the present time.

With such a constitution, since a component of the sound generated with the event is removed through normalization, a reduction of voice recognition accuracy due to the generated sound can be prevented.

Embodiments of the present invention have been described above with reference to the drawings, but a specific constitution is not limited to the above-described constitutions, and various changes in design, etc. are possible without departing from the gist of the present invention.

For example, in the voice processing apparatuses 10, 10A, 10B, 10C, and 10D, the sound source localization unit 101, the sound source tracking unit 102, and the sound source separation unit 103 may be omitted. In that case, any unit that can acquire an audio signal of at least one channel may be used as the input unit 20. The input unit 20 outputs the acquired audio signal to the feature amount acquisition unit 104. The feature amount acquisition unit 104, the utterance state determination unit 105, the average spectrum calculation units 106 and 106B, and the spectrum normalization units 107A, 107B, and 107C perform processes on an audio signal acquired by the input unit 20 rather than performing the processes on a sound-source-specific audio signal for each sound source. Also, the above-described constitutions of the embodiments and the modified examples may be combined with each other, and a partial constitution thereof may be omitted.

Note that in some of the voice processing apparatuses 10, 10A, 10B, 10C, and 10D in the above-described embodiments, for example, the sound source localization unit 101, the sound source tracking unit 102, the sound source separation unit 103, the feature amount acquisition unit 104, the utterance state determination unit 105, the average spectrum calculation units 106 and 106B, the spectrum normalization units 107, 107A, 107B, and 107C, the voice recognition unit 108, the event detection unit 112D, the operation detection unit 115D, and the synthesized voice detection unit 116D may be realized using a computer. In this case, a program for realizing the control functions may be recorded on a non-transitory computer-readable recording medium, and the program recorded on the recording medium may be read to and executed in a computer system to realize the control functions. Note that "the computer system" described here is one of computer systems built in the voice processing apparatuses 10, 10A, 10B, 10C, and 10D and is assumed to include an operating system (OS) and hardware such as peripheral apparatuses.

Also, "the computer-readable recording medium" refers to a portable medium such as a flexible disk, a magneto optical disc, a ROM, a CD-ROM, and a storage apparatus such as hard disk built in a computer system. "The computer-readable recording medium" may include a medium which dynamically holds a program for a short period of time such as a communication wire in a case in which the program is transmitted via a network such as the Internet or a communication line such as a telephone line and a medium storing the program for a certain period of time like a volatile memory inside the computer system serving as a server or a client in such a case. The above-described program may be a program for realizing some of the above-described functions, and the above-described functions can be realized in combination with a program which has already been stored in a computer system.

Also, some or all of the voice processing apparatuses 10, 10A, 10B, 10C, and 10D in the above-described embodiments and modified examples may be realized as an integrated circuit such a large scale integration (LSI). Functional blocks of the voice processing apparatuses 10, 10A, 10B, 10C, and 10D may be individually configured as processors, and some or all thereof may be integrated to be configured as processors. A technique of constituting the apparatuses as integrated circuits may not be limited to an LSI but may be realized as a dedicated circuit or a general-purpose processor. When a technique of constituting the apparatuses as integrated circuits constituting the LSI appears due to advances in semiconductor technology, integrated circuits corresponding to the technology may be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A voice processing apparatus comprising at least one processor and a memory, the memory having stored thereon a program which, when executed by the at least one processor, causes the at least one processor to function as:
   a feature amount acquisition unit configured to acquire a spectrum of an audio signal for each frame;
   an utterance state determination unit configured to determine an utterance state for each frame on the basis of the audio signal;
   a spectrum normalization unit configured to calculate a normalized spectrum in a current utterance by normalizing the spectrum for each frame in the current utterance using at least an average spectrum acquired until the present time; and
   an event detection unit configured to detect an event which changes an acoustic environment,
   wherein
   the spectrum normalization unit uses an average spectrum from a start of the current utterance to the present time as the average spectrum,
   the spectrum normalization unit uses an average spectrum after the event is detected as the average spectrum acquired until the present time,
   the event detection unit detects a sound related to the event, and the spectrum normalization unit uses an average spectrum of a sound detected by the event detection unit as the average spectrum from the start of the current utterance to the present time,
   the event detection unit detects predetermined acoustic feature amounts used for a voice recognition process of the sound detected by the event detection unit, and detects the event by determining whether a change amount of the predetermined acoustic feature amounts is greater than a predetermined change amount, and
   the spectrum normalization unit is configured to output the normalized spectrum to an associated voice recognition unit configured to generate utterance data by performing voice recognition processes on the normalized spectrum received from the spectrum normalization unit, and to output the generated utterance data to an associated output unit.

2. The voice processing apparatus according to claim 1, wherein the spectrum normalization unit uses an average spectrum in a previous utterance as the average spectrum.

3. The voice processing apparatus according to claim 1, wherein the spectrum normalization unit uses an average spectrum in a previous utterance between the start of the current utterance and a predetermined time rather than the average spectrum from the start of the current utterance to the present time.

4. The voice processing apparatus according to claim 2, wherein the previous utterance is an utterance immediately before the current utterance.

5. The voice processing apparatus according to claim 2, wherein the previous utterance is a plurality of utterances which is stored in a storage unit in advance.

6. The voice processing apparatus according to claim 1, wherein execution of the program by the at least one processor causes the at least one processor to further function as:
   a sound source localization unit configured to determine a sound source direction on the basis of a multi-channel sound audio signal; and
   a sound source separation unit configured to separate the multi-channel audio signal into audio signals for every sound source on the basis of a transfer function from the sound source direction and output the sound-source-specific audio signals to the feature amount acquisition unit.

7. A voice processing method performed using a voice processing apparatus comprising at least one processor and a memory, the memory having stored thereon a program which, when executed by the at least one processor, causes the at least one processor of the voice processing apparatus to perform the voice processing method comprising:
   a feature amount acquisition step of acquiring a spectrum of an audio signal for each frame;
   an utterance state determination step of determining an utterance state for each frame on the basis of the audio signal;
   a spectrum normalization step of calculating a normalized spectrum in a current utterance by normalizing a spectrum for each frame in the current utterance using at least an average spectrum acquired until the present time;
   an event detection step of detecting an event which changes an acoustic environment; and
   an outputting step of outputting the normalized spectrum to an associated voice recognition unit to generate utterance data by performing voice recognition processes on the normalized spectrum, and outputting the generated utterance data to an associated output unit,
   wherein
   the spectrum normalization step uses an average spectrum from a start of the current utterance to the present time as the average spectrum,
   the spectrum normalization step uses an average spectrum after the event is detected as the average spectrum acquired until the present time,
   the event detection step includes detecting a sound related to the event, and the spectrum normalization step uses an average spectrum of a sound detected during the event detection step as the average spectrum from the start of the current utterance to the present time, and the event detection step includes detecting predetermined acoustic feature amounts used for a voice recognition process of the sound detected during the event detection step, and detects the event by determining whether a change amount of the predetermined acoustic feature amounts is greater than a predetermined change amount.

8. The voice processing apparatus according to claim 1, wherein the associated output unit includes a display apparatus configured to display utterance content indicated by the utterance data.

9. The voice processing method according to claim 7, wherein the outputting step includes outputting the generated utterance data to the associated output unit for display of utterance content indicated by the utterance data.

\* \* \* \* \*